US009529071B2

(12) United States Patent
Shibata et al.

(10) Patent No.: US 9,529,071 B2
(45) Date of Patent: *Dec. 27, 2016

(54) ULTRASONIC-WAVE COMMUNICATION SYSTEM

(71) Applicant: Rakuten, Inc., Tokyo (JP)

(72) Inventors: Yo Shibata, Tokyo (JP); Misato Takahashi, Tokyo (JP); Yuki Sato, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/648,295

(22) PCT Filed: Dec. 27, 2013

(86) PCT No.: PCT/JP2013/085071
§ 371 (c)(1),
(2) Date: May 29, 2015

(87) PCT Pub. No.: WO2014/104284
PCT Pub. Date: Jul. 3, 2014

(65) Prior Publication Data
US 2015/0309151 A1    Oct. 29, 2015

(30) Foreign Application Priority Data
Dec. 28, 2012   (JP) .................... 2012-288264

(51) Int. Cl.
*G06F 21/00*   (2013.01)
*G01S 1/72*   (2006.01)
(Continued)

(52) U.S. Cl.
CPC .................. *G01S 1/725* (2013.01); *G01S 1/74* (2013.01); *H04B 11/00* (2013.01); *H04L 9/00* (2013.01);
(Continued)

(58) Field of Classification Search
CPC .................................................. H04L 63/0428
See application file for complete search history.

(56) References Cited

U.S. PATENT DOCUMENTS

| 5,784,005 A * | 7/1998 | Akutsu | ................ | G08B 25/016 340/905 |
| 2004/0105344 A1 * | 6/2004 | Davies | ................... | H04B 11/00 367/134 |

(Continued)

FOREIGN PATENT DOCUMENTS

| CN | 102546032 A | 7/2012 |
| CN | 102739320 A | 10/2012 |

(Continued)

OTHER PUBLICATIONS

Will Archer Arentz et al., "Near Ultrasonic Directional Data Transfer for Modern Smartphones", In Proceedings of the 13th International Conference on Ubiquitous Computing, UbiComp '11, ACM, Sep. 21, 2011, pp. 481-482, <http://dl.acm.org/citation.cfm?id=2030181>.

(Continued)

*Primary Examiner* — Morshed Mehedi
(74) *Attorney, Agent, or Firm* — Sughrue Mion, PLLC

(57) ABSTRACT

Provided is an ultrasonic-wave communication system where the influence of ambient noise and the Doppler effect are suppressed and where a user of a portable terminal is prevented from hearing unwanted sound. After performing encryption processing of store information, a beacon 5 placed in a salesroom 3 sends out store-information-containing beacon information of one channel as ultrasonic waves into the salesroom 3 by combining a control carrier, a first carrier, and a second carrier in such a way that a first carrier signal and a second carrier signal are output between control carrier signals a number of times according to the (Continued)

store information and that a state where the first carrier signal and/or the second carrier signal is output is maintained.

14 Claims, 17 Drawing Sheets

(51) Int. Cl.
*H04L 9/00* (2006.01)
*H04W 12/00* (2009.01)
*G01S 1/74* (2006.01)
*H04B 11/00* (2006.01)
*H04L 29/06* (2006.01)

(52) U.S. Cl.
CPC .......... *H04L 63/0428* (2013.01); *H04W 12/00* (2013.01)

(56) References Cited

U.S. PATENT DOCUMENTS

| | | | | |
|---|---|---|---|---|
| 2005/0124345 A1* | 6/2005 | Laroia | .................. | H04W 36/06 455/437 |
| 2006/0009883 A1* | 1/2006 | Takeichi | ............... | G01S 15/931 701/1 |
| 2008/0112885 A1* | 5/2008 | Okunev | ............. | A61B 1/00016 424/9.1 |
| 2009/0067292 A1 | 3/2009 | Matsuoka | | |
| 2010/0303129 A1* | 12/2010 | Huang | .................... | G01S 1/042 375/132 |
| 2012/0051187 A1* | 3/2012 | Paulson | ................... | H04B 1/06 367/135 |
| 2013/0099975 A1* | 4/2013 | Cyganski | .............. | G01S 5/0205 342/432 |
| 2013/0322214 A1* | 12/2013 | Neukirch | .................. | G01S 5/20 367/118 |
| 2014/0075349 A1* | 3/2014 | Yun | ........................ | G06F 3/013 715/764 |

FOREIGN PATENT DOCUMENTS

| | | |
|---|---|---|
| JP | 2013-141054 A | 7/2013 |
| WO | 2007/097157 A1 | 8/2007 |
| WO | 2011/014292 A1 | 2/2011 |

OTHER PUBLICATIONS

International Search Report for PCT/JP2013/085071 dated Apr. 1, 2014.
Communication dated Feb. 24, 2016 from the European Patent Office in counterpart application No. 13869763.6.
Communication dated Apr. 8, 2016 from the State Intellectual Property Office of the P.R.C. in counterpart application No. 201380068329.5.

* cited by examiner

FIG.16

| COMBINATION OF CARRIER SIGNALS | DATA TO BE ASSIGNED |
|---|---|
| CONTROL CARRIER - FIRST CARRIER | 01 |
| CONTROL CARRIER - SECOND CARRIER | 02 |
| CONTROL CARRIER - THIRD CARRIER | 03 |
| CONTROL CARRIER - FOURTH CARRIER | 04 |
| CONTROL CARRIER - FIFTH CARRIER | 05 |
| CONTROL CARRIER - SIXTH CARRIER | 06 |
| FIRST CARRIER - SECOND CARRIER | 07 |
| FIRST CARRIER - THIRD CARRIER | 08 |
| FIRST CARRIER - FOURTH CARRIER | 09 |
| FIRST CARRIER - FIFTH CARRIER | 10 |
| FIRST CARRIER - SIXTH CARRIER | 11 |
| SECOND CARRIER - THIRD CARRIER | 12 |
| SECOND CARRIER - FOURTH CARRIER | 13 |
| SECOND CARRIER - FIFTH CARRIER | 14 |
| SECOND CARRIER - SIXTH CARRIER | 15 |
| THIRD CARRIER - FOURTH CARRIER | 16 |
| THIRD CARRIER - FIFTH CARRIER | 17 |
| THIRD CARRIER - SIXTH CARRIER | 18 |
| FOURTH CARRIER - FIFTH CARRIER | 19 |
| FOURTH CARRIER - SIXTH CARRIER | 20 |
| FIFTH CARRIER - SIXTH CARRIER | 21 |

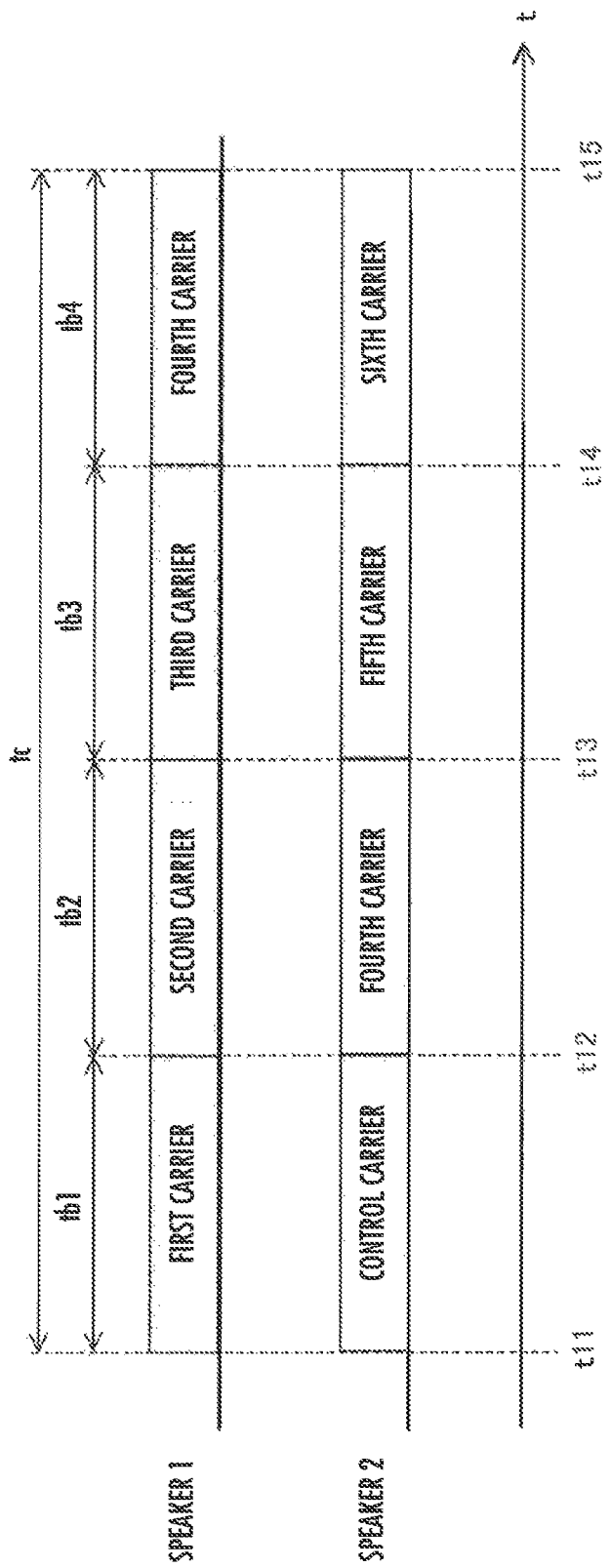

ULTRASONIC-WAVE COMMUNICATION SYSTEM

CROSS REFERENCE TO RELATED APPLICATIONS

This application is a National Stage of International Application No. PCT/JP2013/085071 filed Dec. 27, 2013, claiming priority based on Japanese Patent Application No. 2012-288264 filed Dec. 28, 2012, the contents of all of which are incorporated herein by reference in their entirety.

TECHNICAL FIELD

The present invention relates to an ultrasonic-wave communication system using a beacon and a portable terminal, and more particularly to an ultrasonic-wave communication system having excellent communication performance with a simple configuration using a beacon which emits ultrasonic waves and a portable terminal such as a smartphone or a cell phone, a beacon used in the ultrasonic-wave communication system, a portable terminal program used in the ultrasonic-wave communication system, and a server for providing the portable terminal program.

BACKGROUND ART

In recent years, along with the spread to general users of portable terminals such as smartphones and cell phones, there has been proposed a system for improving convenience for a user's access, merchandise purchase, or the like and for improving services by providing information from a store to a user, providing point reduction or other various services, or the like, for example, by installing an ultrasonic beacon in a store to communicate with a user's portable terminal by using ultrasonic waves.

Now, considering technical and fundamental constraints that should be thought about when using a microphone of a portable terminal such as a smartphone or a cell phone, the following constraints (constraint 1) to (constraint 6) are found.

(Constraint 1) Frequency Characteristics of Microphone

Various models of portable terminals are present and new models are put on the market every day. Therefore, testing all models of portable terminals on a one-by-one basis leads to large cost and it is very important to avoid the large cost by using a program independent of the circumstances unique to each model of the portable terminal.

Particularly, in the case of a smartphone application, the field where the application is provided (Apple Store®, Google Play®, etc.) is not classified to the fields corresponding to the models of portable terminals, and therefore the smartphone application needs to be compatible with a plurality of models of portable terminals (including new models of portable terminals to be put on the market in the future) by using one kind of program.

In this regard, the microphone built in a portable terminal has frequency characteristics (frequency-dependent sensitivities) and especially the frequency characteristics in a high-pitched sound range (substantially 18 kHz or more) which is outside the audible range vary widely among portable terminals. Furthermore, it is difficult to measure the sound volume (which means a sound pressure level and the same applies hereinafter) in a state where the frequency characteristics of the microphone of the portable terminal are unknown.

Therefore, the variations in the frequency characteristics of the microphone present in each model of the portable terminal makes it difficult to measure the sound volume on the same standard by using one kind of program which can be used independently of the model of the portable terminal.

Specifically, even in the case of outputting sound having a certain frequency with a certain sound volume from a beacon, the measured sound volume vary according to the model of the portable terminal which measures the sound (due to a difference in the frequency characteristics of the built-in microphone).

Similarly, even in the case of outputting two sounds having pitches different from each other to some extent (by several hundred Hz) or more with the same sound volume, the volumes of these two sounds which can be measured by the portable terminal may be different from each other due to a difference in the frequency characteristics.

Thus, it is difficult to use a difference in the volumes of two sounds having pitches different from each other to some extent for a parameter of communication in a state where the frequency characteristics of the portable terminal are unknown.

(Constraint 2) Ambient Noise and Background Noise

There are various high-pitched noises around a store, such as noises from a rat repellent, a cockroach repellent, mosquito sound for preventing young people from hanging out, digital signage, and electrical appliances. Most of these noises occur with constant sound volume at a specific pitch (specific frequency).

It imposes a large cost burden to measure what kinds of noises are present around the store beforehand and the environment changes from moment to moment. Therefore, it is necessary to achieve a communication method less susceptible even if there is a noise in any kind of frequency band.

(Constraint 3) Doppler Effect

Since a user is likely to move even during receiving a sound signal, it is necessary to acquire a communication method in which the Doppler effect is considered.

Specifically, even in the case of outputting a sound having a certain pitch (frequency A) from a beacon, a frequency detected by the portable terminal is likely to deviate from the frequency A due to the Doppler effect. The deviation is determined according to the moving speed or moving direction of the user and therefore it is impossible to assume the deviation in advance.

According to the observation results of the inventors, change in frequency caused by the Doppler effect when a user uses a cell phone in a general using method is as much as plus or minus 200 Hz at maximum.

(Constraint 4) Available Bandwidth

The upper limit of a human audible range is said to be 18 kHz, 19 kHz, or 20 kHz though there are individual differences and differences by age. If a value is less than the upper limit, the sound would be heard by a human being (lower limit).

On the other hand, a typical sampling rate used when the portable terminal processes the audio file and audio input and output is 44,100 Hz, and the theoretical upper limit of a detectable frequency is 22,050 Hz (Nyquist frequency: one half of the sampling rate) (upper limit).

In fact, due to the characteristics of the microphone described in the constraint 1, filtering for keeping the quality (for example, a low-pass filter), or the like, there are many portable terminals whose detectable upper limit is around 21 kHz. Therefore, as a communication frequency between a beacon and a portable terminal, it is necessary to use a limited frequency band having a lower limit of 18 kHz, 19 kHz, or 20 kHz and an upper limit of 21 kHz or 22.05 kHz.

(Constraint 5) Available Modulation Scheme

There is a phase modulation as a scheme often used to convert CDMA or other digital data to an analog waveform signal.

The phase modulation is commonly used since it is resistant to ambient noise and its demodulation is not so difficult even if a signal level is low. If, however, a signal in the modulation scheme is output from a speaker, audible sound is output from the speaker during phase modulation and therefore it is difficult to achieve a sufficiently large sound volume, in other words, a sufficiently large arrival range of the signal, granting that even a frequency exceeding the audible range is used.

Moreover, the above easily occurs particularly in a piezo-electric speaker which is used for downsizing a beacon (because a film easily moves in response to a small change in voltage) and therefore it also hinders the downsizing of the beacon.

(Constraint 6) Fraud by Audio Recording

If a signal output from the beacon is detectable by the microphone of a smartphone or a cell phone, the signal can also be recorded. Therefore, when detecting in which store the portable terminal is present by using a beacon placed in the store as in this situation, it is possible to disguisedly act as if a signal output from the beacon in the store were detected by illegally recording and reproducing the signal output from the beacon in the store, which may lead to a serious problem depending on the form of a service to be used.

(Conventional Technology)

In Patent Document 1, there is proposed a presence detection method and system including: outputting signals having a plurality of frequencies with constant sound volume from a beacon in a store, assuming the combination of the frequencies to be unique to the store, receiving the signals having the plurality of frequencies from the beacon at a portable terminal, and identifying the store by determining which frequency is output.

The presence detection method and system in Patent Document 1 are strongly influenced by the frequency characteristics of the portable terminal (the aforementioned constraint 1). Specifically, if there is a portable terminal whose sensitivity to a specific frequency band is extremely low, the portable terminal cannot detect sound even if the sound is output in the frequency band. Moreover, the presence detection method and system are strongly influenced by the Doppler effect (the aforementioned constraint 3). Due to the Doppler effect, it cannot be accurately found which frequency is output while the user is roaming with the terminal.

In addition, the presence detection method and system in Patent Document 1 are unresistant to ambient noise (the aforementioned constraint 2). The following problems are estimated: there is no method in which a signal output from the beacon is distinguished from ambient noise; practically the system is able to transmit only a few bits of information (assuming that the FFT resolution ranges from 10 to 100 Hz) due to the above (constraint 4) though a frequency band to be used has to be widened in order to increase the amount of information to be transmitted, and the like.

Moreover, the presence detection method and system in Patent Document 1 may also be configured to send a signal in a Morse code manner by turning on or off a specific frequency (referred to as "carrier": a plurality of frequencies may be used) on the store side.

In this case, the content of a signal and the frequency used for the carrier are unique to the store and the transmission content is changed according to time. Therefore, it is considered that the amount of information which can be transmitted increases.

In the conventional example, however, if information is carried on a single carrier, the information is more likely to be demodulated as a different signal in the case where noise occurs in the frequency concerned and much information cannot be sent in a short time when using only a single carrier.

Moreover, determining whether ringing is made on the single carrier requires the setting of a threshold or the like. It is, however, extremely difficult to set an appropriate threshold value due to an influence of microphone characteristics (the aforementioned constraint 1).

Furthermore, it is necessary to change the threshold value for each portable terminal or for each location, thus requiring thousands of man-hours and complicating the program.

Still further, in the case of sending information on a plurality of carriers, each information is sent on each carrier and therefore synchronization between carriers cannot be achieved. Specifically, the number of ringing carriers at a certain moment is not constant and the timing of rising vary depends on each carrier. Accordingly, comparison for each frequency cannot be performed at detection and therefore it is necessary to observe the change with time of the carriers as in the case of the single carrier. In that case, the same problems as in the case of the single carrier occur.

CITATION LIST

Patent Document

Patent Document 1: International Patent (Laid-Open) No. 2011/014292

SUMMARY OF INVENTION

Technical Problem

The problem to be solved by the present invention is that there is no ultrasonic-wave communication system using a beacon and a portable terminal, which considers a difference in frequency characteristics of a microphone of an individual portable terminal, is not influenced by ambient noise or the Doppler effect caused by movement of the location of the portable terminal itself, does not give a user anxiety caused by hearing unwanted sound, is superior in security, and provides excellent communication performance with a simple configuration.

Solution to Problem

The present invention has been made to solve the above problems. Therefore, the present invention relates to an ultrasonic-wave communication system which performs communication by ultrasonic waves between a beacon which emits ultrasonic waves and a portable terminal.

In addition, the ultrasonic-wave communication system is characterized by that the beacon is configured to be able to emit three or more signal carriers predetermined as frequencies different from each other, to output a data signal formed by the three or more signal carriers according to predetermined information, and to emit a dummy signal to supplement changes in sound pressure during outputting the data signal so that the sound pressure output from the beacon is within a predetermined range and that the portable terminal includes: a microphone; a demodulation processing unit which performs demodulation processing to demodulate three or more signal carriers by analyzing frequencies or wavelengths of ultrasonic waves sent from the beacon upon receiving the ultrasonic waves; and a decryption processing unit which performs decryption processing to decrypt the predetermined information based on the data signal recognized by the demodulation processing.

According to the present invention, it is possible to achieve and provide an ultrasonic-wave communication system which considers a difference in frequency characteristics of a microphone of an individual portable terminal, for example, in a specific zone provided by an information provider, is not influenced by ambient noise or the Doppler effect caused by the movement of the location of the portable terminal itself, does not give a user anxiety caused by hearing unwanted sound, and provides excellent communication performance with a simple configuration between the beacon on the information provider side and the portable terminal.

Moreover, the ultrasonic-wave communication system is characterized by that the beacon outputs the data signal formed by the signal carriers a predetermined number of times between predetermined control signals each of which is formed by one or more of the three or more signal carriers.

Furthermore, the ultrasonic-wave communication system is characterized by that, in a case where n is a number of signal carriers set in the beacon, a number of signal carriers simultaneously output from the beacon is one or more and less than n.

Moreover, the ultrasonic-wave communication system is characterized by including a plurality of the beacons, wherein a combination of the three or more signal carriers is individually assigned to each beacon with frequency settings being different from each other, and each beacon generates beacon information of one channel based on an assigned combination and sends out the beacon information as an ultrasonic wave and wherein the demodulation processing unit of the portable terminal receives the beacon information suitable for frequency characteristics of the microphone among the beacon information of the ultrasonic wave sent from the respective beacons and performs demodulation processing for the received beacon information.

According to the above configuration, there are provided a plurality of beacons which send out ultrasonic waves having different frequencies and the customer's portable terminal receives transmission information of ultrasonic waves in the most suitable channel for the frequency characteristics of the microphone of the customer's portable terminal, thereby achieving and providing an ultrasonic-wave communication system capable of overcoming the difference in frequency characteristics of the individual microphone and providing high-quality information distribution to each customer.

Furthermore, the ultrasonic-wave communication system is characterized by that the beacon generates the beacon information of one channel made by combining the three or more signal carriers by a plurality of channels with the frequencies thereof different from each other and sends out the beacon information of the plurality of channels in the form of ultrasonic waves and that the demodulation processing unit of the portable terminal receives the beacon information of a channel suitable for the frequency characteristics of the microphone of the portable terminal among the beacon information of the ultrasonic waves of the plurality of channels sent from the beacon and performs the demodulation processing for the received beacon information.

According to the above configuration, one beacon sends out the same ultrasonic-wave signal in a plurality of channels different in frequencies to the portable terminal, thereby achieving and providing an ultrasonic-wave communication system capable of overcoming the difference in frequency characteristics of the portable terminal, enabling the signal to be received from the information provider or the store in the most suitable channel for the individual portable terminal, and capable of providing high-quality information distribution to each customer.

Moreover, the ultrasonic-wave communication system is characterized by that the portable terminal includes a unit which acquires Internet information from a server through the Internet and a unit which outputs the acquired Internet information as ultrasonic waves from a speaker and that the beacon includes a microphone and a unit which acquires the Internet information provided from the server via the portable terminal by receiving the Internet information of the ultrasonic waves output from the speaker of the portable terminal via the microphone.

In the case of performing maintenance such as changing the predetermined information for the beacon, it is conceivable to rewrite the setting of the beacon information or the like by performing communication between the beacon and a maintenance device. As a communication interface between the beacon and the maintenance device in this case, it is possible to use a general-purpose communication interface such as a wireless LAN, USB (Universal Serial Bus), an infrared ray, Bluetooth®, or the like. The inclusion of the communication interface circuit in the beacon interferes with downsizing of the beacon and leads to an increase in component cost.

Therefore, in this configuration, the beacon placed in the specific zone is allowed to receive the Internet information by using the Internet environment of the customer-side portable terminal. Accordingly, even if the information provider or the store does not have an interface circuit exclusive for maintenance, the maintenance, update, or the like can be performed for the beacon by acquiring maintenance or update information from the server through the Internet. This eliminates the necessity for the inclusion of the general-purpose communication interface circuit in the beacon as described above, thereby achieving and providing an ultrasonic-wave communication system which contributes to cost reduction, labor saving, and space saving.

Moreover, the ultrasonic-wave communication system is characterized by that the plurality of beacons are arranged in the specific zones and that the beacon having acquired the Internet information from the server via the portable terminal outputs the Internet information in the form of ultrasonic waves from the speaker and other beacons receive the Internet information in the form of the ultrasonic waves through the microphones, by which the Internet information is transmitted between the plurality of beacons.

According to the above configuration, an indirect and simple network using the Internet environment of the customer-side portable terminal is achieved between the plurality of beacons placed in the specific zones. Therefore, maintenance, update, or the like is able to be performed for each beacon by transmitting maintenance or update information acquired from the server to the plurality of beacons without preparing a local network on the information provider side or on the store side.

Furthermore, the ultrasonic-wave communication system is characterized by including a storage unit which stores a predetermined number of data of the predetermined information with contents of the data different from each other, wherein the beacon acquires the data of the predetermined information with the contents different from the storage unit and updates the predetermined information used to generate the data signal when the number of times the data signal is sent out exceeds a predetermined number of times or when a period in which the data signal is sent out exceeds a predetermined period.

According to the above configuration, the ultrasonic-wave communication system includes a storage unit which stores a predetermined number of data of the predetermined information with contents of the data different from each other and the beacon acquires and sends out the predetermined information with the contents different from each other from the storage unit when the beacon information is output a predetermined number of times or when a period in which the beacon information is sent out exceeds a predetermined period. This enables the achievement and provision of an ultrasonic-wave communication system capable of avoiding a situation where an illegal user disguisedly acts as if he/she is present in the place where the beacon is placed by previously recording the beacon information sent from the beacon of the information provider or the store and sending the recorded beacon information later to the portable terminal.

Moreover, the ultrasonic-wave communication system is characterized by that the beacon generates the three or more signal carriers by performing amplitude modulation using signals indicating the predetermined information with respect to three or more carrier signals having frequencies outside an audible range.

According to the above configuration, the plurality of data carriers having the predetermined information are able to be easily generated.

Moreover, the ultrasonic-wave communication system is characterized by that the number of carrier signals simultaneously output from the three or more signal carriers is constant in the data signal.

According to the above configuration, the constant number of the carrier signals simultaneously output enables the sound pressure of ultrasonic waves to be substantially constant when the beacon information is sent out, thereby making it more difficult for a user to hear harsh sounds.

Moreover, the ultrasonic-wave communication system is characterized by that the beacon generates the data signal by using the encrypted predetermined information and that the portable terminal recognizes the predetermined information by decrypting the encrypted predetermined information demodulated from the data signal received from the beacon.

According to the above configuration, the predetermined information provided to the portable terminal from the beacon is encrypted, thereby improving security.

Moreover, the ultrasonic-wave communication system is characterized by including a server able to communicate with the portable terminal, wherein the beacon includes: a first clock unit; a storage unit which holds data of a first encryption key random number table by which an encryption key according to clock time of the first clock unit is determined by a predetermined logic; an encryption processing unit which encrypts the predetermined information by a first encryption key determined according to the first encryption key random number table; and an encryption key access prohibiting unit which prohibits access to the first encryption key random number table from units other than the encryption processing unit, and the beacon generates the data signal by using the encrypted predetermined information; and wherein the server includes: a second clock unit configured to have clock time the same as the clock time of the first clock unit; and a storage unit which holds data of a second encryption key random number table having the same configuration as the first encryption key random number table, and the server recognizes the predetermined information by decrypting the encrypted data, when receiving encrypted data encrypted by the first encryption key from the portable terminal, by using a second encryption key obtained by applying the clock time of the second clock unit at receiving the encrypted data to the second encryption key random number table.

According to the above configuration, since the clock time of the first clock unit is the same as the clock time of the second clock unit, the first encryption key determined according to the first encryption key random number table is the same as the second encryption key determined according to the second encryption key random number table on the same time. Therefore, the encryption processing in the beacon and the decryption processing in the server are able to be performed by using the first encryption key and the second encryption key, which are identical, by setting the time required for communication between the beacon and the portable terminal and between the server and the portable terminal so as to be within a negligible range relative to the timing units of the first clock unit and the second clock unit.

Furthermore, since the encryption key access prohibiting unit prohibits access to the first encryption key random number table from units other than the encryption processing unit, it is impossible for a person who attempts illegality to decrypt an encryption key generation rule of the first encryption key random number table by randomly applying the clock time to the first encryption key random number table from the outside.

Subsequently, according to the present invention, there is provided a beacon, which is used in an ultrasonic-wave communication system which performs communication using ultrasonic waves between a beacon which emits ultrasonic waves and a portable terminal, wherein: the beacon is configured to be able to emit three or more signal carriers predetermined as frequencies different from each other and to output a data signal formed by the three or more signal carriers according to predetermined information; and the beacon is configured to emit a dummy signal to supplement changes in sound pressure during generation of the data signal so that the sound pressure output from the beacon is within a predetermined range.

By using the beacon according to the present invention, it is possible to achieve and provide an ultrasonic-wave communication system which considers a difference in frequency characteristics of a microphone of an individual portable terminal, for example, in a specific zone provided by an information provider, is not influenced by ambient noise or the Doppler effect caused by the movement of the location of the portable terminal itself, does not give a user anxiety caused by hearing unwanted sound, and provides excellent communication performance with a simple configuration between the beacon on the information provider side and the portable terminal.

Subsequently, according to the present invention, there is provided a portable terminal program used in an ultrasonic-wave communication system which performs communication using ultrasonic waves between a beacon which emits ultrasonic waves and a portable terminal, the program being executed in a CPU installed in the portable terminal to cause the CPU to function as: a demodulation processing unit which performs demodulation processing to demodulate three or more signal carriers by analyzing frequencies or wavelengths of a data signal upon receiving the data signal sent from the beacon, the data signal being formed by three or more signal carriers predetermined as frequencies different from each other according to predetermined information and including data signal with a dummy signal emitted to supplement changes in sound pressure so that the sound pressure is within a predetermined range; and a decryption processing unit which decrypts the predetermined information based on the data signal recognized by the demodulation processing.

The portable terminal program according to the present invention is executed in the CPU installed in the portable terminal, thereby easily enabling the configuration of the portable terminal usable in the ultrasonic-wave communication system.

Subsequently, according to the present invention, there is provided a program providing server capable of communicating with a portable terminal used in an ultrasonic-wave communication system which performs communication using ultrasonic waves, via a network, between a beacon which emits ultrasonic waves and a portable terminal, wherein the server sends a portable terminal program to the portable terminal, the program being executed in a CPU installed in the portable terminal to cause the CPU to function as: a demodulation processing unit which performs demodulation processing to demodulate three or more signal carriers by analyzing frequencies or wavelengths of a data signal upon receiving the data signal sent from the beacon, the data signal being formed by three or more signal carriers predetermined as frequencies different from each other according to predetermined information and including a dummy signal emitted to supplement changes in sound pressure so that the sound pressure is within a predetermined range; and a decryption processing unit which decrypts the predetermined information based on the data signal recognized by the demodulation processing.

The program providing server according to the present invention sends the portable terminal program to the portable terminal to cause the CPU installed in the portable terminal to execute the portable terminal program, thereby easily enabling the configuration of the portable terminal usable in the ultrasonic-wave communication system.

BRIEF DESCRIPTION OF DRAWINGS

FIG. 16 is an explanatory diagram of a mapping table used in the ultrasonic-wave communication system according to the embodiment.

FIG. 17 is a timing chart in the case of sending the control carrier and the data carrier from two speakers in the ultrasonic-wave communication system according to the fifth embodiment.

DESCRIPTION OF EMBODIMENTS

Hereinafter, an ultrasonic-wave communication system using a beacon and a portable terminal according to embodiments of the present invention will be described in detail with reference to the drawings.

First Embodiment

An ultrasonic-wave communication system 1 according to a first embodiment will be described with reference to FIGS. 1 to 8.

Figure 1:
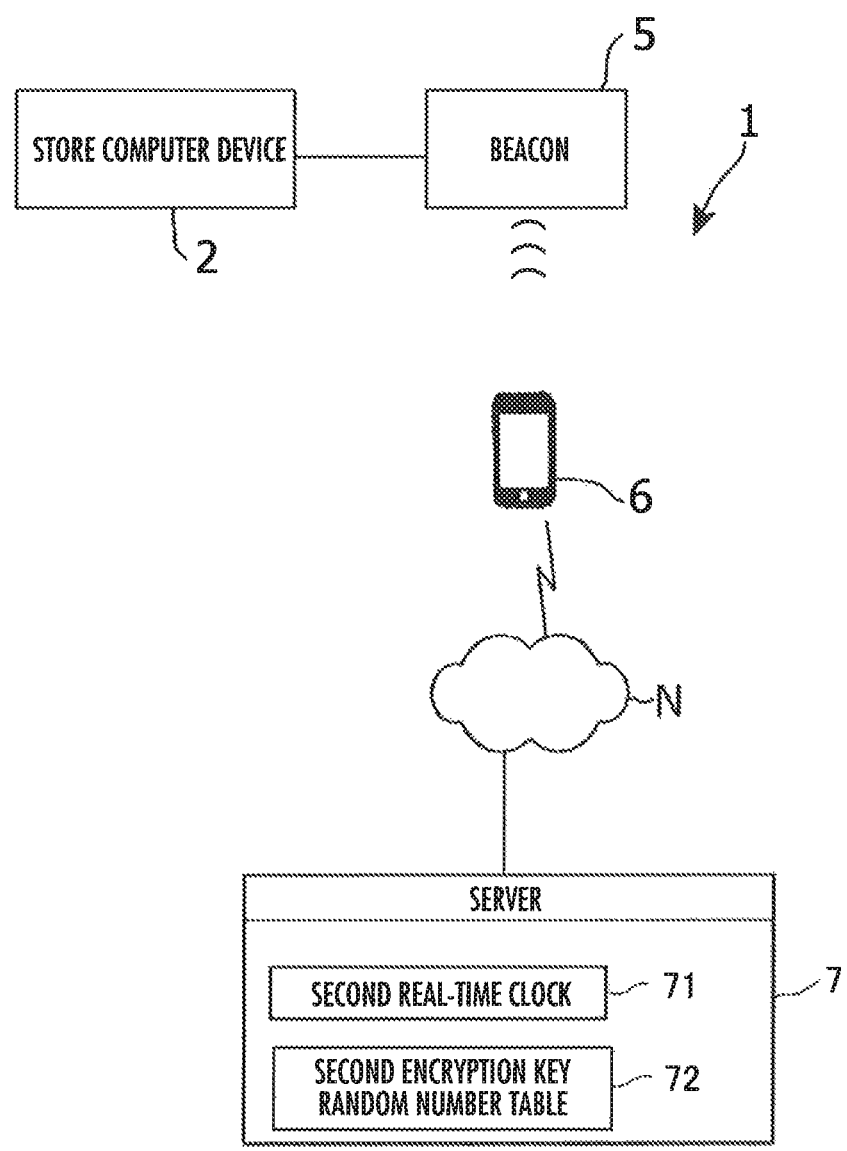
FIG. 1 is a schematic configuration diagram illustrating the overall configuration of an ultrasonic-wave communication system according to a first embodiment of the present invention.
Figure 2:
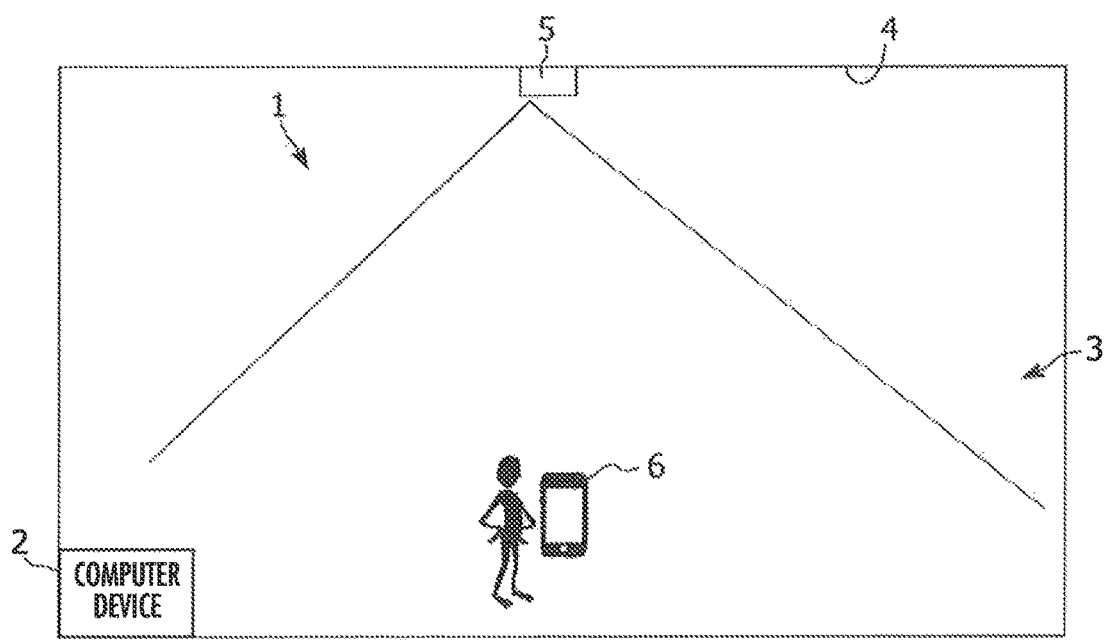
FIG. 2 is an explanatory diagram illustrating an installation state of a beacon of the ultrasonic-wave communication system according to the first embodiment.

As illustrated in FIG. 1, the ultrasonic-wave communication system 1 according to the first embodiment includes: a store-side computer device 2 as in a store such as, for example, a retail store or a mass merchandiser; a beacon 5 which is arranged, for example, on a ceiling 4 of a salesroom 3 provided on one floor by the store as illustrated in FIG. 2 to emit ultrasonic waves with being connected to the store-side computer device 2; a portable terminal 6 such as, for example, a smartphone which is held by an individual customer to communicate with the beacon 5; an Internet network N to which the customer performs wireless connection by operating his/her own portable terminal 6 in order to acquire Internet information; and a server 7 (including the function of a program providing server of the present invention) which distributes the Internet information to the portable terminal 6 through the Internet network N.

Figure 3:
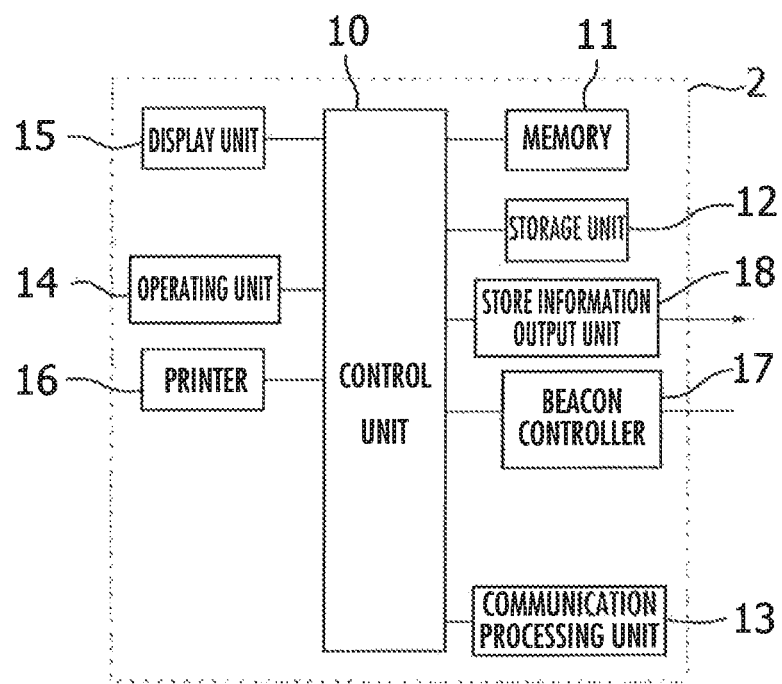
FIG. 3 is a schematic block diagram of a store-side computer device of the ultrasonic-wave communication system according to the first embodiment.

As illustrated in FIG. 3, the store-side computer device 2 includes: a memory 11 which stores various programs for operation, for actions of the ultrasonic-wave communication system 1, and the like; a control unit 10 which controls the entire computer device 2; a storage unit 12 which stores various information; a communication processing unit 13 for connecting to the Internet network N; an operating unit 14 such as a keyboard for performing various operations; a display unit 15 such as an LCD display or the like which displays various kinds of information on a screen; a printer 16 which prints out various kinds of information; a store information output unit 18 which outputs store information that the store wants to send such as service information, advertising information, or the like to the customers created by a store-side operator; and a beacon controller 17 which outputs a control carrier control signal for performing output control of a control carrier (corresponding to a signal carrier of the present invention) described later in detail, a frequency switching signal for switching the transmission frequency of beacon information transmitted from the beacon 5 into the salesroom 3, and the like to the beacon 5.

Figure 4:
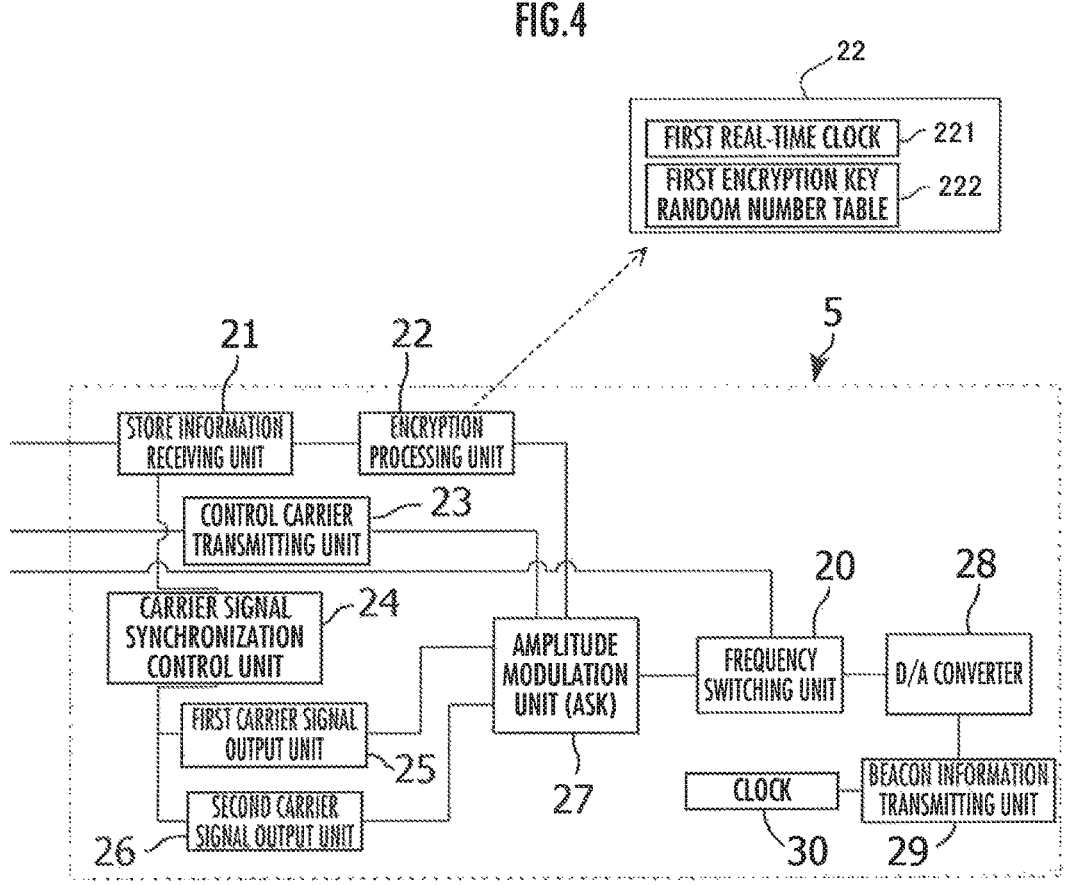
FIG. 4 is a schematic block diagram of a beacon placed in the store of the ultrasonic-wave communication system according to the first embodiment.

As illustrated in FIG. 4, the beacon 5 includes: a store information receiving unit 21 which receives store information (corresponding to predetermined information of the present invention) to be transmitted from the store-side computer device 2; an encryption processing unit 22 which performs encryption processing of the store information output from the store information receiving unit 21, the encryption processing unit 22 being configured to contain a random number table (first encryption key random number table) and a real-time clock (first real-time clock) in a single arithmetic chip; a control carrier transmitting unit 23 which outputs a control carrier signal (rectangular wave signal) representing the signal starting point in a given cycle, the control carrier transmitting unit 23 being controlled by the control carrier control signal; a carrier signal synchronization control unit 24 which operates a first carrier signal output unit 25 and a second carrier signal output unit 26 described later in synchronization with the store information; the first carrier signal output unit 25 which outputs a first carrier signal (analog signal) under the control of the carrier signal synchronization control unit 24; the second carrier signal output unit 26 which outputs a second carrier signal (analog signal) under the control of the carrier signal synchronization control unit 24; an amplitude modulation unit (amplitude shift keying [ASK]) 27 which performs amplitude modulation in response to inputs of the store information, the first carrier signal, and the second carrier signal and then outputs a first carrier and a second carrier (corresponding to signal carriers of the present invention) carrying the store information; a D/A converter 28 which converts the control carrier, the first carrier, and the second carrier from digital to analog to obtain beacon information; a beacon information transmitting unit 29 which transmits the beacon information as ultrasonic-wave information into the salesroom 3; a clock 30 which is for use in adding time information to the beacon information; and a frequency switching unit 20 which performs frequency switching of the output signal from the amplitude modulation unit 27 as required, the frequency switching unit 20 being connected between the amplitude modulation unit 27 and the D/A converter 28.

The first carrier and the second carrier have adjacent frequencies outside the audible range (for example, the first carrier: 19,000 Hz, the second carrier: 19,050 Hz) and are two digital signals at paired sound volume levels. A combination of the digital signals forms beacon information (corresponding to a data signal of the present invention) including the store information as a single channel.

A difference in frequency between the first carrier and the second carrier is set so as to be as small as possible as long as the FFT (fast Fourier transform: corresponding to frequency analysis of the present invention) resolution permits, where the FFT resolution is a function of the portable terminal 6 of an individual user. The frequency analysis may be performed by using a technique other than the FFT. Alternatively, it is possible to extract the control carrier, the first carrier, and the second carrier by wavelength analysis.

The above is made in consideration of an advantage that, if the frequencies are sufficiently close to each other, it is possible to reduce the influence of a difference in the frequency characteristics of a microphone 36 of the portable terminal 6 and thus to enable ignoring the difference in the frequency characteristics of the microphone 36 of the individual portable terminal 6 in the constraint 1 described above.

Moreover, for the difference in frequency between the first carrier and the second carrier, it is assumed that a previously-defined constant is used in an available frequency band.

Furthermore, note that the beacon 5 uses a channel less influenced by ambient noise. In the case of using a plurality of beacons 5 at the same time, it should be noted that appropriately each beacon 5 uses a channel not used by other beacons 5.

Although the details are described later, the encryption processing unit 22 has a first real-time clock 221 and a storage unit which holds data of a first encryption key random number table 222, which are used for performing encryption processing of the store information. Moreover, as illustrated in FIG. 1, the server 7 has a second real-time clock 71 and a storage unit which holds data of a second encryption key random number table 72, which are used for performing decryption processing of the store information.

Moreover, the server 7 sends data of an application program for ultrasonic-wave communication (corresponding to a portable terminal program of the present invention) executed by the portable terminal 6 in response to a download request from the portable terminal 6.

Figure 5:
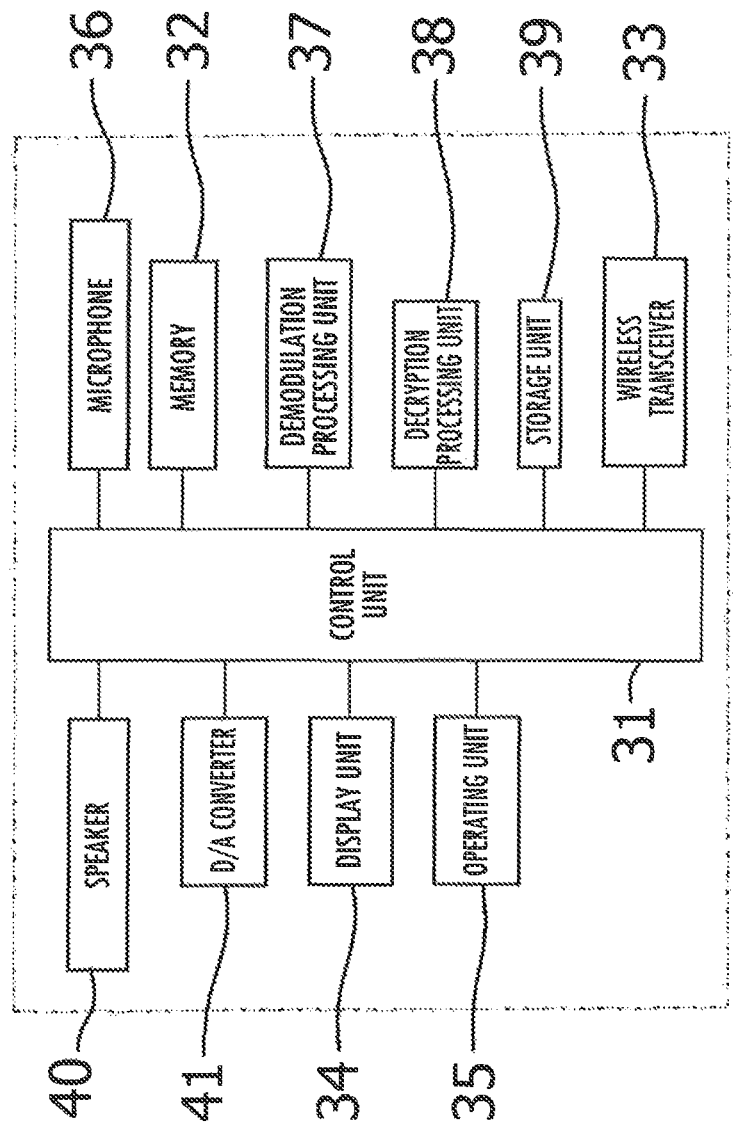
FIG. 5 is a block diagram illustrating a schematic configuration of a portable terminal in the ultrasonic-wave communication system according to the first embodiment.

As illustrated in FIG. 5, the portable terminal 6 includes: a control unit 31 which controls the operation of the portable terminal 6; a memory 32 which stores operation programs of the portable terminal 6 (a basic program of an OS or the like, an application program downloaded from the server 7, and the like); a wireless transceiver 33 for performing wireless connection with the Internet network N; a display unit 34 such as an LCD display or the like which displays various information; an operating unit 35 formed by, for example, tablet-type input keys or the like; a microphone 36 which receives ultrasonic waves corresponding to the beacon information from the beacon information transmitting unit 29; a storage unit 39 which stores various information; a speaker 40 which performs operations such as pronouncing and transmitting the Internet information received from the server 7 as ultrasonic-wave information to the beacon 5 by using the Internet network N; and a D/A converter 41 which performs digital-to-analog conversion for causing the speaker 40 to pronounce the Internet information or the like.

Furthermore, the portable terminal 6 executes the application program stored in the memory 32 in the central processing unit (CPU: not illustrated) installed in the portable terminal 6 to cause the CPU to function as a demodulation processing unit 37 which demodulates the beacon information received by the microphone 36 and converted into an electrical signal (described later in detail) and as a decryption processing unit 38 which decrypts the store information included in the beacon information demodulated by the demodulation processing unit 37.

Figure 6:
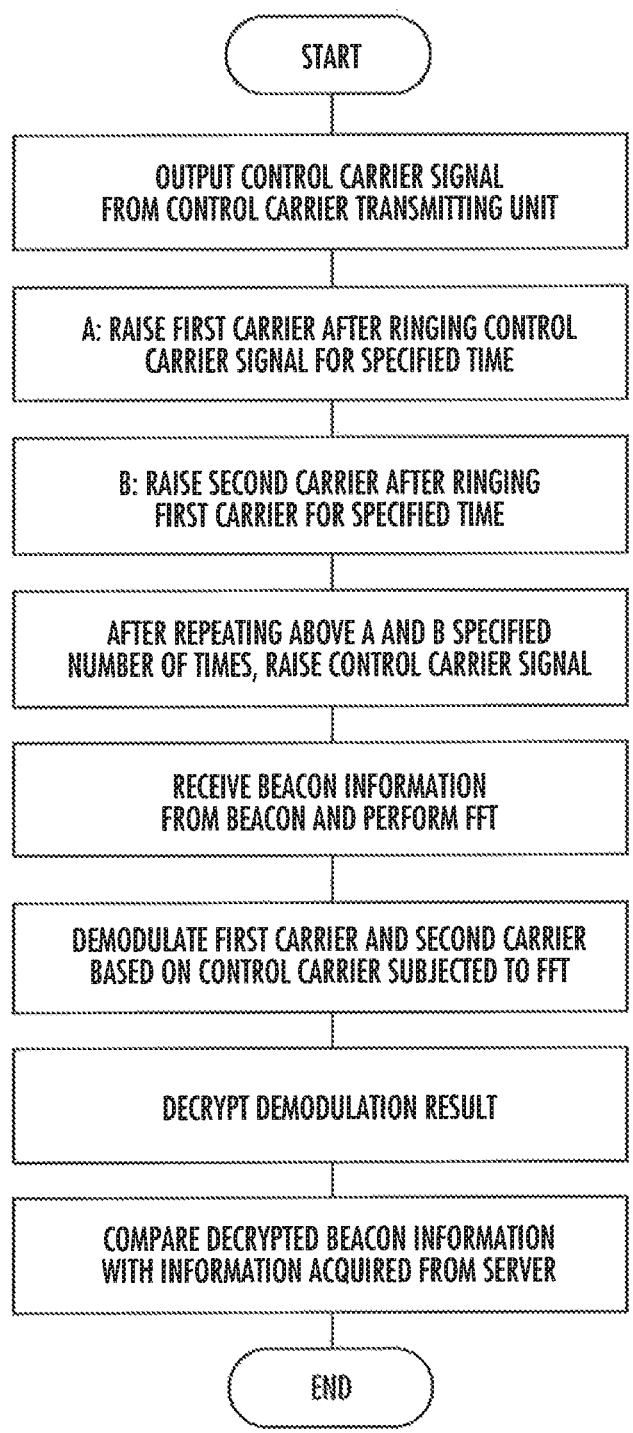
FIG. 6 is a flowchart illustrating the processing flow of the beacon and the portable terminal of the ultrasonic-wave communication system according to the first embodiment.

Subsequently, the operation of the ultrasonic-wave communication system 1 according to the first embodiment will be described in detail with reference to FIGS. 6 to 8.

In the ultrasonic-wave communication system 1 of the first embodiment, the carriers carrying a plurality of frequencies are determined in a bandwidth available for communication (the constraint 4) and amplitude modulation processing is performed for the transmitted store information and the plurality of carrying carriers before the store transmits the store information to the portable terminal 6 of a customer from the beacon 5 placed on the ceiling 4 of the salesroom 3.

Assuming here that terms such as "a carrying carrier rises" means that a carrying carrier having a certain frequency shifts from a non-ringing state to a ringing state (a carrier signal of a carrying carrier shifts from a non-output state to an output state), the following description will be made.

The operation of the ultrasonic-wave communication system 1 according to the first embodiment will be described in detail below with reference to FIGS. 6 and 7.

[Beacon 5 Side]

(1) The store information receiving unit 21 of the beacon 5 receives and outputs store information which has been created by the store-side computer device 2 and is to be sent to the portable terminal 6 of a customer. The encryption processing unit 22 performs encryption processing of the store information and outputs the store information, though the details thereof will be described later.

Figure 7:
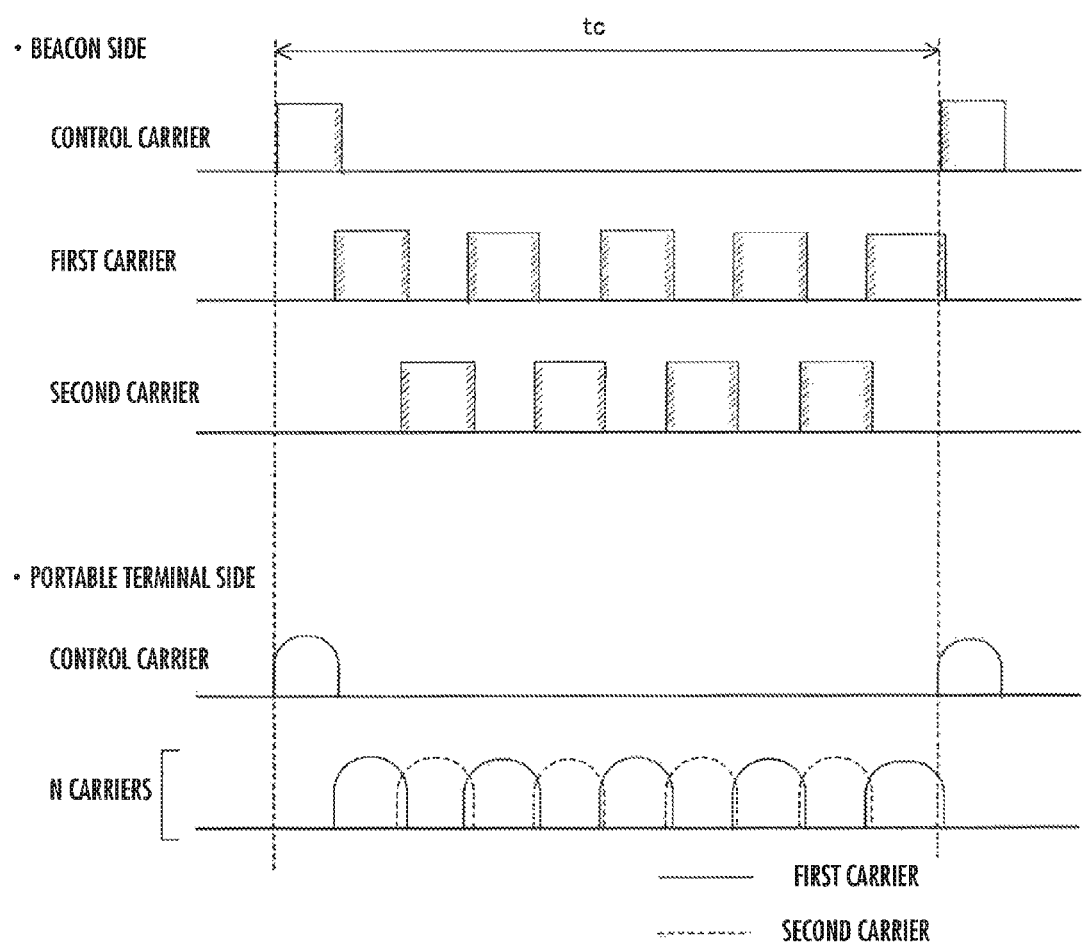
FIG. 7 is an explanatory diagram illustrating the output waveforms of the beacon before D/A conversion and the demodulation waveforms of the portable terminal in the ultrasonic-wave communication system according to the first embodiment.

(2) The control carrier transmitting unit 23 of the beacon 5 is controlled by a control carrier control signal from the beacon controller 17 of the store-side computer device 2 to output a control carrier signal (a rectangular wave signal: corresponding to a control signal of the present invention) representing a signal starting point in a given cycle (one cycle time width tc) as illustrated in FIG. 7. The time point at which the control carrier signal rises first is defined as the starting time point of the signal. The control signal may be formed by a plurality of control carrier signals.

(3) Subsequently, after outputting (ringing) the control carrier signal for a specified time (t), for example, the first carrier is raised. In this case, which carriers rise and how many carriers rise (how many carrier signals of which carriers will be output) are determined based on store information that the store wants to send. Specifically, the carrier signal synchronization control unit 24 sends the first carrier signal to the amplitude modulation unit 27 by using the first carrier signal output unit 25 in synchronization with the store information and generates the first carrier by performing amplitude modulation for the first carrier signal by using the store information signal.

(4) After ringing the first carrier raised in the above (3) for a specified time (after outputting the first carrier signal of the first carrier for a specified time), the subsequent second carrier is determined based on the store information that the store wants to send similarly and raised (the second carrier signal of the second carrier is output). Specifically, the carrier signal synchronization control unit 24 sends the first carrier signal to the amplitude modulation unit 27 by using the second carrier signal output unit 26 in synchronization with the store information and generates the second carrier by performing amplitude modulation for the second carrier signal by using the store information signal.

(5) After repeating the above (3) and (4) a specified number of times, a signal representing the starting time point of the above (2) is raised again. This processing is repeated in sequence.

[Portable Terminal 6 Side]

(1) The portable terminal 6 performs FFT (fast Fourier transform) of the beacon information received via the microphone 36 by using the demodulation processing unit 37 and stores and retains the transformed beacon information in the storage unit 39. The waveforms of the control carrier, the first carrier, and the second carrier subjected to the FFT processing are illustrated in FIG. 7.

(2) Subsequently, the demodulation processing unit 37 detects the starting time point of the signal corresponding to the rise of the control carrier (the starting time of outputting the control carrier signal) and determines an edge of a rise between the control carrier signals in the retained beacon information.

(3) Furthermore, a section during which the first carrier and the second carrier are ringing (a section between the control carrier signals) is identified on the basis of the edge determined in the above (2) to estimate the carriers ringing during each section (the output first carrier signal and second carrier signal).

At this time, the beacon specifies N as the number of carriers ringing at the same time, by which it is possible to estimate N carriers (five first carriers and four second carriers in FIG. 7) as ringing sounds (the number of the output first carrier signals and second carrier signals) in the section from loud carriers in a certain section.

(4) Subsequently, the decryption processing unit 38 decrypts the five first carrier signals and the four second carrier signals as store information received from the beacon 5 in the section by performing signal determining processing for each individual section of the first carrier and the second carrier illustrated in FIG. 7 on the basis of the result of the above (3). At this time, the portable terminal 6 is also able to perform error detection and correction or decryption processing in the case where the decrypted store information includes an encrypted part, if needed.

In this regard, as for the error detection and correction, for example, the beacon 5 transmits the same beacon information repeatedly and therefore the portable terminal 6 is able to perform error detection and correction of the beacon information by determining coincidence between data of the beacon information received at different timings. Moreover, after placing a plurality of beacons 5 using channels having different bandwidths and sending the same beacon information from the beacons 5, the portable terminal 6 may perform error detection and correction of the beacon information by determining whether the data of the beacon information received through the channels having different bandwidths coincide with each other. Furthermore, it is also possible to adopt a general error detection method such as cyclic redundancy check (CRC) to perform the error detection and correction of the beacon information.

Moreover, as the decryption processing, a method using the aforementioned encryption key or the like may be used.

(5) Subsequently, the portable terminal 6 wirelessly communicates with the server 7 through the Internet network N to compare the server information distributed from the server 7 with the content received from the beacon 5. If both coincide with each other, the presence of the customer in the store is identified (the presence confirmation of the customer).

The processing of the presence confirmation of the customer is performed by the operations of the beacon 5 and the portable terminal 6 described above through a series of processes such as, for example: (i) Data of the store ID (store information) is sent from the beacon 5 to the portable terminal 6 through ultrasonic waves; (ii) Data of the store ID and of the user ID of the portable terminal is sent from the portable terminal 6 to the server 7 through the Internet network N; (iii) The server 7 which has received the data of the store ID and the user ID recognizes that the user corresponding to the user ID is present in the store corresponding to the store ID and sets a visiting point; and (iv) the visiting point data is sent from the server 7 to the portable terminal 6 and thereby the user of the portable terminal 6 acquires the visiting point.

The first embodiment is configured to perform communication between the beacon 5 and the portable terminal 6 by using ultrasonic waves outside the audible frequency range. As illustrated in FIG. 7, the first carrier signal and the second carrier signal between the control carrier signals are output so as to be partially overlapped with each other (the shaded areas in FIG. 7).

In this case, at least one of the first carrier signal and the second carrier signal is output between the control carrier signals and the sound volume in the entire frequency range of the ultrasonic waves transmitted from the beacon 5 is substantially constant. Therefore, it is difficult for a person (a customer or an employee) to hear the sound. Thus, it is possible to provide an ultrasonic-wave communication system 1 capable of eliminating psychological resistance or anxiety without giving a sense of anxiety and capable of performing information distribution with high accuracy based on more accurate position information in a stable state.

Moreover, the beacon 5 of the first embodiment operates stably, which leads to low maintenance cost, and therefore is easily introduced into a store or the like. Thus, the introduction-oriented expansion of the beacon 5 is achieved, thereby enabling a system provider to easily perform sales activities advantageously.

Furthermore, in the communication between the beacon 5 and the portable terminal 6 in the first embodiment, the portable terminal 6 performs the demodulation processing of the control carrier and the first and second carriers having a plurality of frequencies adjacent to each other with the presence of store information divided into given sections and performs the decryption processing of the effective portions of the demodulated signals of the first carrier and the second carrier in each given section.

Therefore, the ultrasonic-wave communication system is not easily influenced by microphone characteristics, ambient noise, the Doppler effect, and the like, without interference with ambient noise generated by a rat repellent, a cockroach repellent, mosquito sound for preventing young people from hanging out, an ultrasonic cleaning machine for glasses or the like, digital signage, electrical appliances, and the like, thus achieving an ultrasonic-wave communication system which is resistant to ambient noise and is able to ensure stable communication.

Due to the technical constraints 1 to 3 as described above in the portable terminal 6, it is incomplete to use a communication parameter derived from a comparison or the like in an absolute value of a frequency, an absolute value of sound volume, an absolute value of sound volume of ambient noise, or sound volumes of a plurality of frequencies away from each other to some extent. According to the first embodiment, however, it is possible to achieve and provide the ultrasonic-wave communication system 1 without such drawbacks.

[Encryption Processing of Store Information]

Subsequently, the encryption processing of store information performed by the encryption processing unit 22 will be described below in detail.

The encryption processing unit 22 of the beacon 5 includes a first real-time clock 221 (corresponding to a first clock unit of the present invention) and a storage unit (not illustrated) which retains data of a high-performance first encryption key random number table 222. The first real-time clock 221 and the storage unit which retains data of the first encryption key random number table 222 are packaged in one arithmetic chip.

The first encryption key random number table 222 is used for selecting a unique encryption key from a random number table determined by a predetermined logic for provided time information. The encryption processing unit 22 acquires the unique encryption key (first encryption key) by applying the time information (clock time) obtained by the first real-time clock 221 to the first encryption key random number table 222.

Regarding the first encryption key random number table 222, the storage unit retaining data of the first encryption key random number table 222 is packaged with the first real-time clock 221 in one arithmetic chip, thereby enabling only the time information obtained by the first real-time clock 221 to be applicable to the first encryption key random number table 222. This prohibits a unit or the like other than the encryption processing unit 22 from applying time information to the first encryption key random number table 222 from the outside of the arithmetic chip.

The configuration prohibiting a unit or the like other than the encryption unit 22 from accessing the first encryption key random number table 222 corresponds to an encryption key access prohibiting unit of the present invention. In addition, the first encryption key random number table 222 is assumed to be large enough not to be estimated.

Meanwhile, as illustrated in FIG. 1, the server 7 has a storage unit (not illustrated) retaining data of a second encryption key random number table 72 having the same configuration as the first encryption key random number table 222 used by the beacon 5 and a second real-time clock 71 (corresponding to a second clock unit of the present invention) configured so that the clock time is the same as that of the first real-time clock 221 of the beacon 5.

The first real-time clock 221 and the second real-time clock 71 are configured so as to have the same clock time (the term "the same" does not mean strictly the same, but allows a time difference within a negligible range for the timing units of the first rear-time clock 221 and the second real-time clock 71) at the same time point, for example, by clocking at the standard time recognizable by standard waves transmitted from the standard radio transmitting station.

The server 7 acquires an encryption key (second encryption key) in the same logic as the beacon 5 side by applying the time information obtained by the second real-time clock 71 to the second encryption key random number table 72 having the same configuration as the first encryption key random number table 222 used by the beacon 5.

In this regard, the time information obtained by the first real-time clock 221 on the beacon 5 side is the same as the time information obtained by the second real-time clock 71 on the server 7 side, and therefore the encryption keys (the first encryption key and the second encryption key) selected by the beacon 5 and the server 7 on the same time have the same value. The timing units of the first real-time clock 221 and the second real-time clock 71 are set to values which enable a delay time in communication between the beacon 5 and the portable terminal 6 and in communication between the portable terminal 6 and the server 7 to be ignored.

Thereby, the server 7 receives the encrypted body (encrypted data) sent by the beacon 5 through the portable terminal 6 and the Internet network N, so that the original data having been decrypted is able to be correctly read on the server 7 side.

Regarding an encryption processing unit, in the case of using a normal packaging method in which the real-time clock is separated from the arithmetic chip, the random number table is likely to be restored by sending different time data to the arithmetic chip and analyzing return values.

Since the beacon 5 is a standalone hardware, it is sufficiently conceivable that a brute-force attack is attempted in the case where the beacon 5 is in the hands of a malicious third party due to theft or the like. In addition, if the random number table is restored, the encryption of other beacons having the same encryption table can be decrypted, and therefore the damage range is large.

Today, with the global adoption of high-performance cell phones (hereinafter, referred to as "smartphones"), service utilizing the position information is rapidly increasing. Among them, an application for supporting sales promotion of an actual store by utilizing the position information function of a smartphone is a market expected to grow even further in the future.

Meanwhile, it is conceivable that the growing market increases the risk of appearance of a service user who disguises or falsifies the position information recognized by the smartphone in the way not assumed by a service provider to illegally obtain a prize or the like.

According to the ultrasonic-wave communication system 1 of the first embodiment having the above configuration, the configuration of the encryption processing unit 22 described above effectively prevents the position information from being disguised or falsified, thereby making it difficult to decrypt a random number table by brute-force attacks through knocking the beacon 5 and thus remarkably improving the security of the ultrasonic-wave communication system 1.

Furthermore, additionally describing the encryption processing of the store information performed by the encryption processing unit 22, the communication content may be configured to be divided into a plaintext unique value which is a value unique to the beacon 5 and an encrypted body value which is a value obtained by encrypting arbitrary data.

The inclusion of the plaintext unique value into the communication content enables identification of which beacon 5 sends the information, even in the case where the information cannot be decrypted.

Particularly, an occurrence of error for some reason in the real-time clock is a trouble that can be sufficiently assumed. In that case, it is beneficial to identify the beacon 5 where the trouble occurs.

As a specific example of the aforementioned plaintext unique value, the plaintext unique value may include an ID number or the like indicating a device or a store in which the device is placed.

Moreover, as a specific example of the encrypted body value, the encrypted body value may include a password for authenticating the validity of the information which is not disguised or falsified or may include communication content to be confidential.

Thereby, even in the case where the information cannot be decrypted for some reason, it is possible to know which beacon 5 or store has a trouble by means of an ID number sent in a plaintext.

According to the configuration of the encryption processing of the store information performed by the encryption processing unit 22 as described above, there are the following advantages.

Specifically, since the beacon information transmitted by the beacon 5 placed in a store or the like is able to be freely received by a large unspecified number of portable terminals 6 in the vicinity of the beacon 5, the beacon information involves risk that unencrypted information, if any, is analyzed and illegally used.

This is due to the particularity that the device (beacon) is placed in a store, which is a space where the traffic of a large unspecified number of people cannot be controlled.

In the encryption of a server-client model, it is general to exchange keys between the server and the client. Regarding the ultrasonic-wave communication system using the beacon and the portable terminal of this embodiment, however, consideration is made for a system in which two-way communication between the beacon 5 and the portable terminal 6 is not performed, and therefore encryption not requiring the exchange of keys is needed.

Furthermore, in the ultrasonic-wave communication system, the beacon 5 itself is not connected to the Internet network N advantageously as described later. This requires an encryption system even not requiring the time synchronization through the Internet network N. According to the configuration of the encryption processing unit 22, it is possible to deal with such a case.

[Frequency Switching Processing]

Figure 8:
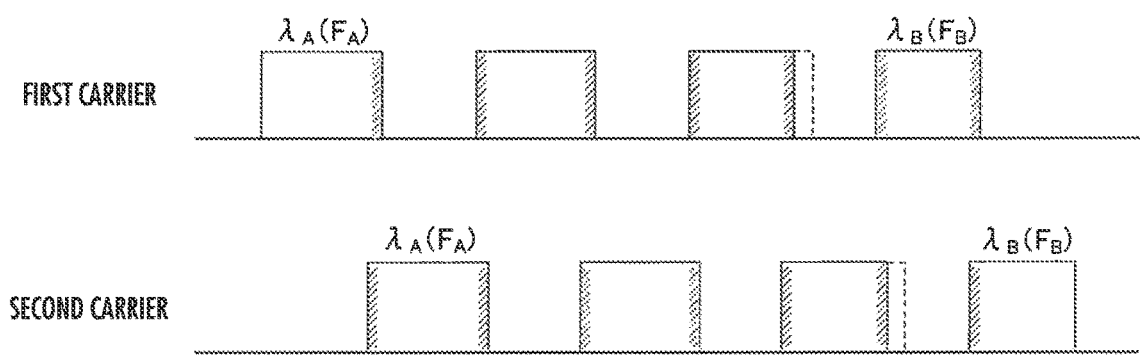
FIG. 8 is an output waveform diagram of the beacon before D/A conversion in the case of performing frequency switching in the ultrasonic-wave communication system according to the first embodiment.

The following describes frequency switching processing of the beacon information performed by the frequency switching unit 20 with reference to FIG. 8.

The frequency switching unit 20 sends a frequency switching signal from the beacon controller 17 to the frequency switching unit 20, if needed, with the waveform of, for example, the control carrier, the first carrier, or the second carrier of the beacon information transmitted from the beacon 5 as a rectangular wave having one level 0 and the other level 1.

As illustrated in FIG. 8, the frequency switching unit 20 prevents a sudden interruption of the waveform by joining together the waveform having a wavelength λA (frequency FA) with the end edge of the waveform ending at level 0 and the waveform having a wavelength λB (frequency FB) with the start edge of the waveform starting at level 0 at their active time points to transmit the beacon information from the beacon 5.

This eliminates a sudden interruption of the signal waveform in the beacon information received by the portable terminal 6. Therefore, it is possible to avoid a disadvantage that a clicking sound (clicking noise) occurs on the receiving side if there is a sudden interruption in the waveform of the transmitted beacon information even in a sound range of 18 kHz or more which exceeds the human audible range, In the ultrasonic-wave communication system 1 of the first embodiment, the technical elements as described below are allowed to be added.

To satisfy the constraint 6 (fraud by audio recording) described above, the beacon information needs to change. In addition, to perform the change in realistic detection time with a large number of stores included, the beacon information needs to contain much store information.

In the case of communication using a plurality of carriers as in the ultrasonic-wave communication system 1 of the first embodiment, it is possible to increase the amount of the store information that can be included in the beacon information and therefore the beacon information is able to include clock information or the like in addition to the store information.

In that case, the beacon information changes with time and therefore the recorded beacon information loses its value.

In the store computer device 2 in the ultrasonic-wave communication system 1 of the first embodiment, the storage unit 12 may be configured to have a large capacity, so that the storage unit 12 retains the store information to be sent to the beacon 5 with a predetermined number of different contents (the predetermined number is, for example, an assumed value of the number of times of transmission for one month).

If this configuration is adopted, the beacon 5 outputs some beacon information a predetermined number of times, and thereupon the store computer device 2 sends store information whose content is changed (updated) to the beacon 5, and then the beacon 5 outputs the next beacon information including store information having a different content.

Thereby, the subsequently output beacon information is known only by an author of the beacon information and it is extremely difficult for a person other than the author to predict the beacon information, thereby avoiding a situation where beacon information issued by the store is illegally recorded for ill-use of the beacon information.

As another configuration, output store information may be updated when a period for which the beacon 5 outputs store information exceeds a predetermined period (for example, one month).

Moreover, the above configuration eliminates the need for maintenance such as time adjustment of the clock in the beacon 5 placed in a place where it is difficult to replace the beacon 5, and it is very useful.

Second Embodiment

An ultrasonic-wave communication system 1A according to a second embodiment of the present invention will be described below with reference to FIGS. 9 and 10.

Since the basic configuration of the ultrasonic-wave communication system 1A according to the second embodiment is the same as that of the first embodiment, the same reference numerals are used for the same elements as in the first embodiment and the description thereof is omitted.

Figure 9:
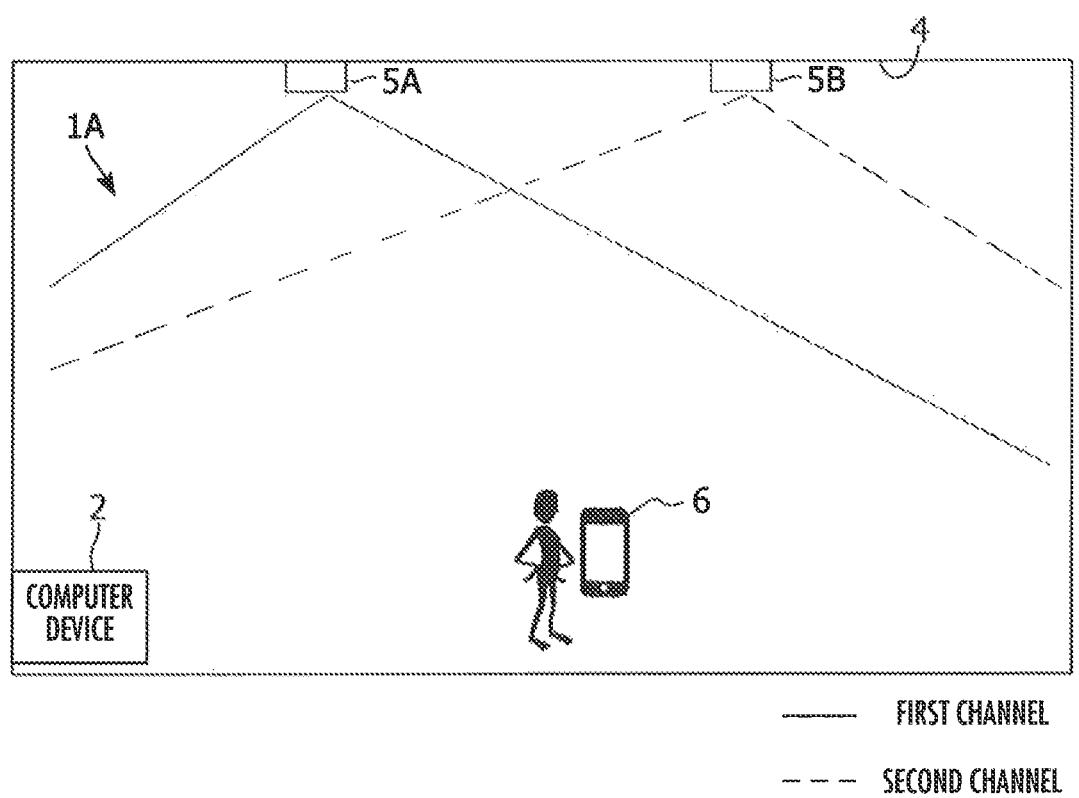
FIG. 9 is a schematic configuration diagram illustrating the overall configuration of an ultrasonic-wave communication system according to a second embodiment of the present invention.
Figure 10:
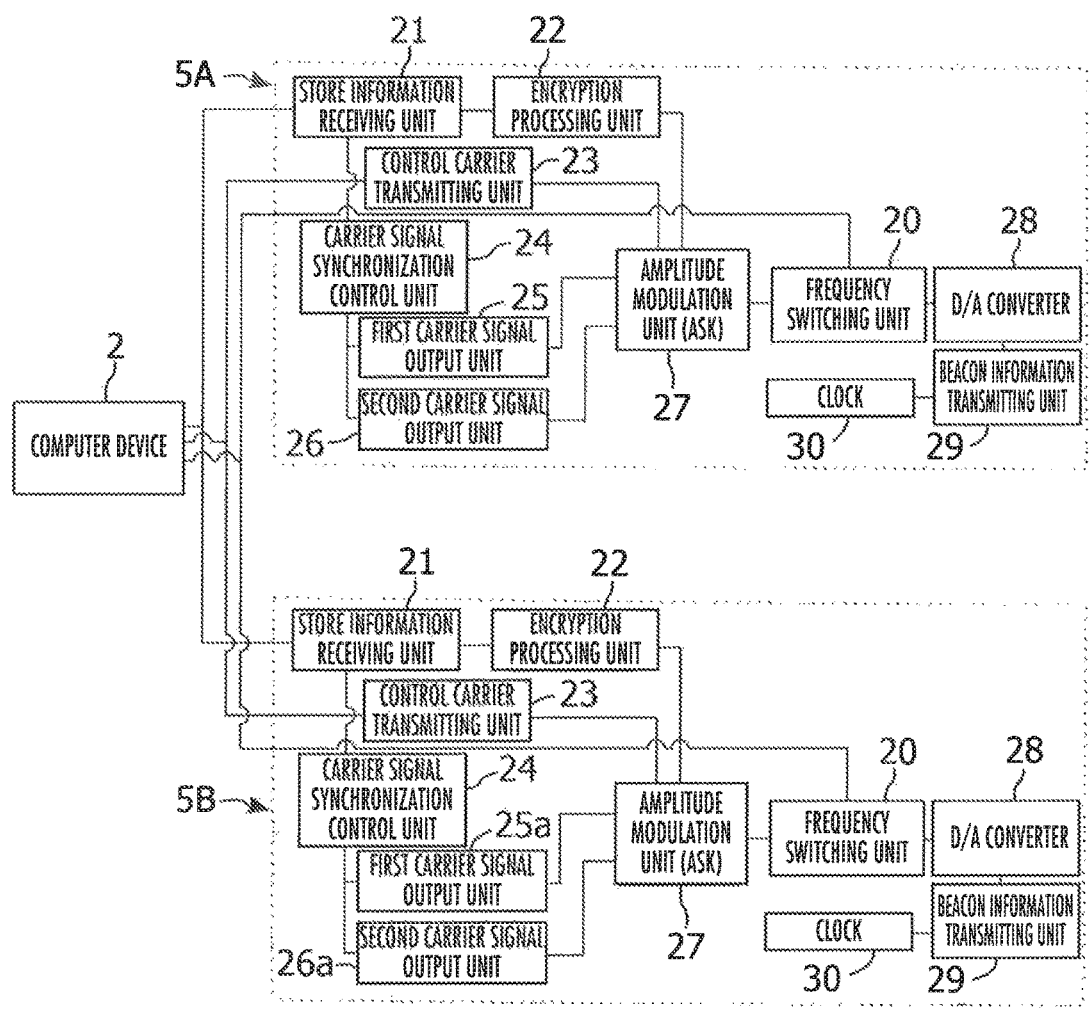
FIG. 10 is a schematic block diagram of a computer device and beacons on the store side of the ultrasonic-wave communication system according to the second embodiment.

As illustrated in FIGS. 9 and 10, the ultrasonic-wave communication system 1A according to the second embodiment is characterized by that two beacons 5A and 5B emitting ultrasonic waves are arranged on, for example, the ceiling 4 in the salesroom 3 provided on one floor by the store and that the frequencies of the respective carriers of the two beacons 5A and 5B are individually assigned to individual beacons with the frequencies different by channel (the respective channels are assumed to be a first channel and a second channel) in the frequency band outside the audible range, so that the beacons 5A and 5B transmit the same transmission information into the salesroom by each channel at the same time, instead of the configuration of the first embodiment. Alternatively, three or more beacons may be provided in the salesroom.

In FIG. 10, a first carrier signal output unit of the beacon 5B is indicated by 25a and a second carrier signal output unit of the beacon 5B is indicated by 26a.

This configuration is synonymous to the formation of a local network through communication using ultrasonic waves between the beacons 5A and 5B, which is advantageous in that the configuration does not require a complicated system for connecting to the Internet network N (see FIG. 1) or an IP network.

Specifically, in one beacon 5A, the frequency of the first carrier is set to 19,000 Hz according to the frequency setting of the first carrier signal output unit 25 and the frequency of the second carrier is set to 19,050 Hz according to the frequency setting of the second carrier signal output unit 26 for the first channel. In the other beacon 5B, the frequency of the first carrier is set to 19,500 Hz according to the frequency setting of the first carrier signal output unit 25a and the frequency of the second carrier is set to 19,550 Hz according to the frequency setting of the second carrier signal output unit 26a for the second channel. Thus, the frequency interval between the first channel and the second channel is large enough (500 Hz).

The communication operation between the beacons 5A and 5B and the portable terminal 6 in the ultrasonic-wave communication system 1A according to the second embodiment is the same as in the first embodiment described above and exerts the same effect as the first embodiment.

Moreover, the microphone 36 of a customer's portable terminal 6 receives beacon information of an ultrasonic wave in the most suitable channel (the first channel or the second channel) for the frequency characteristics of the microphone 36 in the salesroom 3, which allows overcoming the difference in frequency characteristics of the microphone 36 of the individual portable terminal 6 and distributing high-quality store information to the individual customers' portable terminal 6.

Furthermore, the frequency difference between the first channel and the second channel is large enough, by which information is able to be preferably distributed to a large number of customers holding individual portable terminals 6 while preventing interference or crosstalk between the first channel and the second channel.

Also in the ultrasonic-wave communication system 1A of the second embodiment, the same technical elements as described in the first embodiment are allowed to be added, thereby enabling the same operation and effect as those described above to be exerted.

Third Embodiment

An ultrasonic-wave communication system 1B according to a third embodiment of the present invention will be described below with reference to FIGS. 11 and 12.

Since the basic configuration of the ultrasonic-wave communication system 1B according to the third embodiment is substantially the same as that of the second embodiment, the same reference numerals are used for the same elements as in the second embodiment and the description thereof is omitted.

Figure 11:
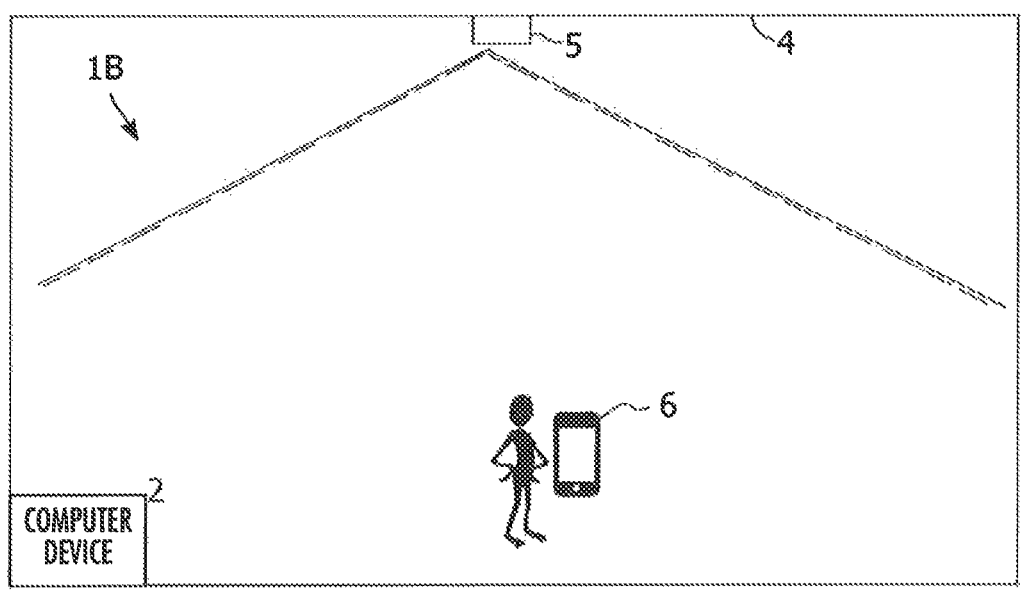
FIG. 11 is a schematic configuration diagram illustrating the overall configuration of an ultrasonic-wave communication system according to a third embodiment of the present invention.
Figure 12:
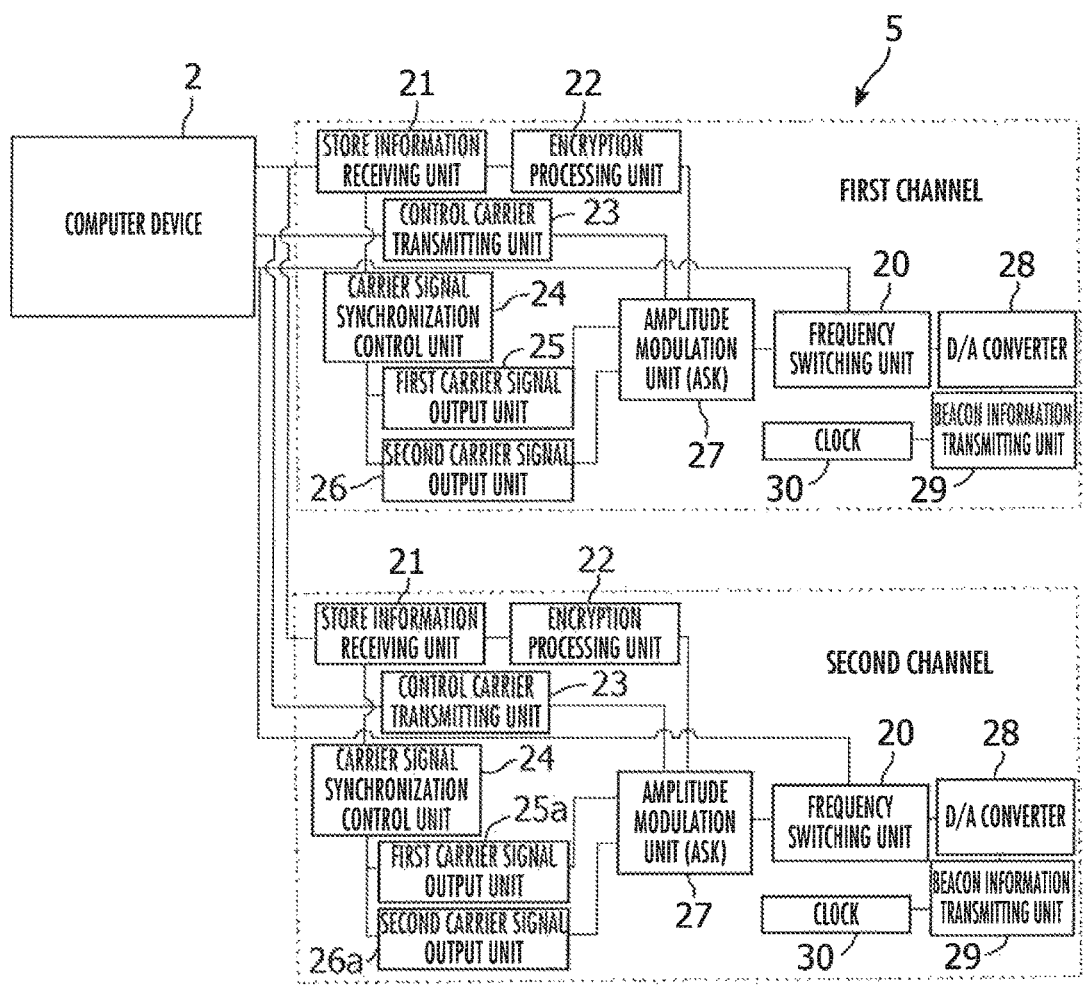
FIG. 12 is a schematic block diagram of a beacon of the ultrasonic-wave communication system according to the third embodiment.

As illustrated FIGS. 11 and 12, the ultrasonic-wave communication system 1B according to the third embodiment is characterized in that one beacon 5 sends out two ultrasonic-wave signals of the first and second channels having different frequencies as described in the second embodiment to the portable terminals 6. Alternatively, the beacon 5 may send out ultrasonic-wave signals of three or more channels.

According to the ultrasonic-wave communication system 1B of the third embodiment, it is possible to provide an ultrasonic-wave communication system 1 which exerts the same operation and effect as in the first embodiment and which is able to overcome the technical constraint 1 (difference in frequency characteristics) of the portable terminals 6 so that the individual portable terminals 6 are able to receive and decrypt the beacon information over the most suitable channel by sending beacon information of an ultrasonic wave having the same content from one beacon 5 to customers' portable terminals 6 over the first and second channels as illustrated in FIG. 11 (redundancy).

Also in the ultrasonic-wave communication system 1B of the third embodiment, the same technical elements as described in the first embodiment are allowed to be added, thereby enabling the same operation and effect as those described above to be exerted.

Fourth Embodiment

Figure 13:
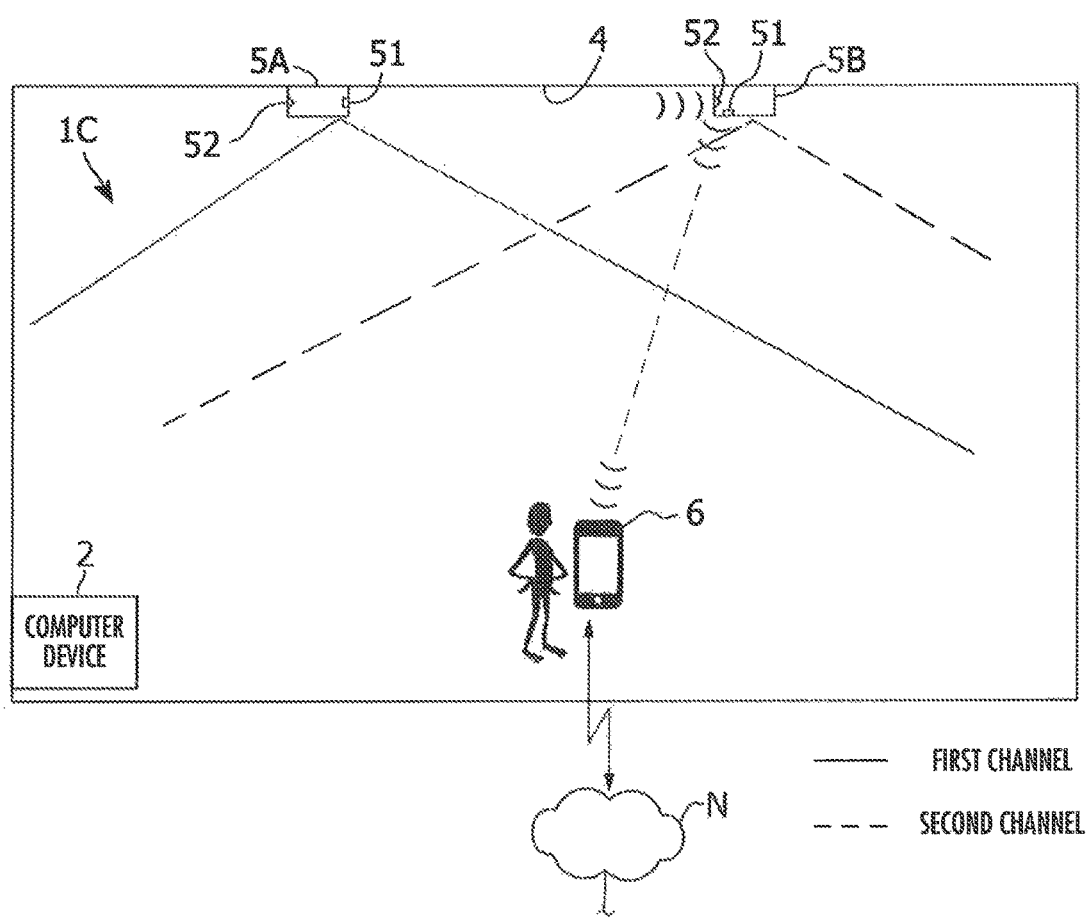
FIG. 13 is a schematic configuration diagram illustrating the overall configuration of an ultrasonic-wave communication system according to a fourth embodiment of the present invention.
Figure 14:
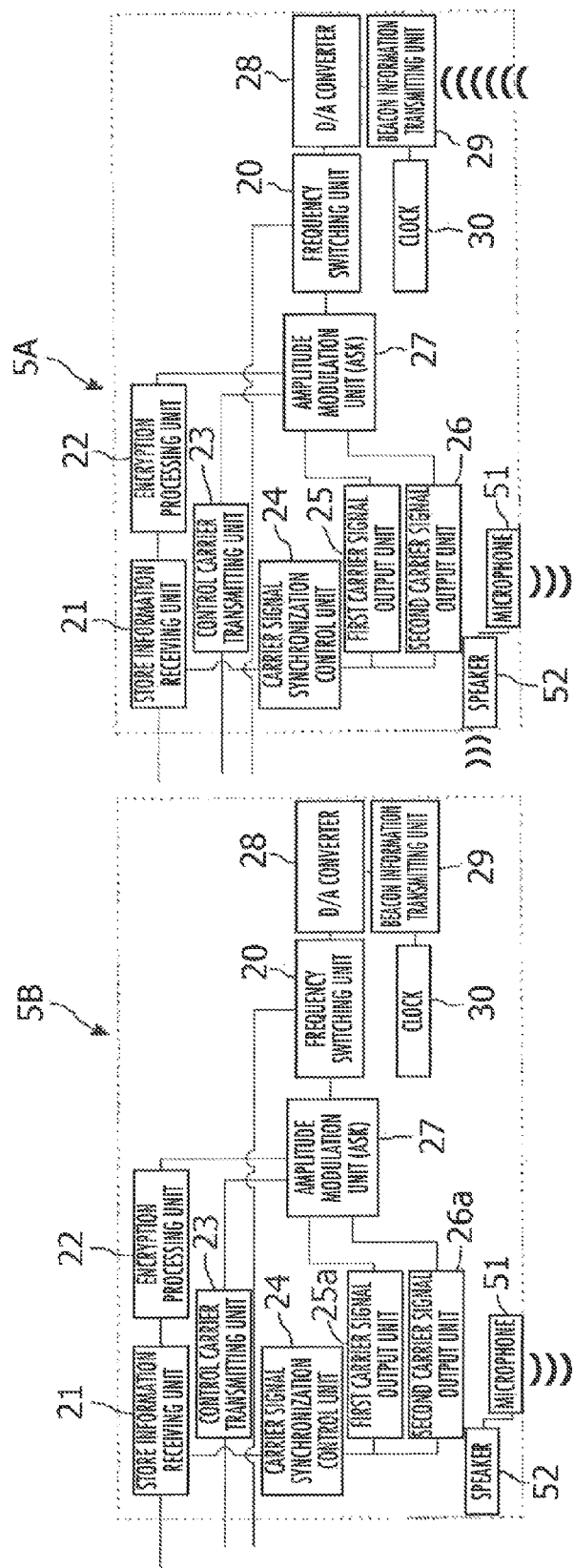
FIG. 14 is a schematic block diagram of beacons of the ultrasonic-wave communication system according to the fourth embodiment.

An ultrasonic-wave communication system 1C according to a fourth embodiment of the present invention will be described below with reference to FIGS. 13 and 14.

Since the basic configuration of the ultrasonic-wave communication system 1C according to the fourth embodiment is substantially the same as that of the first and second embodiments, the same reference numerals are used for the same elements.

The ultrasonic-wave communication system 1C according to the fourth embodiment is characterized in that, for example, two beacons 5A and 5B emitting ultrasonic waves are arranged on, for example, the ceiling 4 in the salesroom 3 similarly to the second embodiment and that a microphone 51 and a speaker 52 are added to each of the beacons 5A and 5B in addition to the configuration of the second embodiment.

The operation of the distribution of the beacon information of ultrasonic waves from the beacons 5A and 5B to the portable terminals 6 in the fourth embodiment is the same as that in the second embodiment. Therefore, the ultrasonic-wave communication system 1C according to the fourth embodiment is also able to exert the same operation and effect as in the ultrasonic-wave communication system 1A of the second embodiment.

Moreover, in the ultrasonic-wave communication system 1C according to the fourth embodiment, the microphone 51 of one of the beacons 5A and 5B (for example, the beacon 5B) receives Internet information (by using the Internet environment) of ultrasonic waves which has been acquired through Internet connection with the server 7 by a customer's operation of the portable terminal 6 (the portable terminal 6 usually has a means for connecting to the Internet network N) and transmitted from the speaker 40.

Then, the speaker 52 of the beacon (beacon 5B) which has received the Internet information sends the information as the Internet information of ultrasonic waves to the microphone 51 of the other beacon (beacon 5A), thereby enabling the construction of an indirect network using the Internet environment of the portable terminal 6 (the portable terminal 6 usually has a means for connecting to the Internet). In the case where the received Internet information is encrypted, the beacon decrypts the information by using the built-in CPU.

Thereby, the store is able to acquire maintenance or update information from the server 7 via the indirect network using the customer's portable terminal 6 described above and to perform maintenance or update of the beacons 5A and 5B, which leads to a substantial cost reduction, labor saving, space saving, and increased flexibility of the installation place.

Furthermore, in a store which runs a multi-store operation, maintenance or update can be performed indirectly via a network by using the Internet information acquired by the customers' portable terminals 6 even if the beacons scattered all over the country are not connected to the Internet, thereby achieving a substantial cost reduction, labor saving, and space saving, and further increased flexibility of the installation place advantageously.

Furthermore, although not illustrated, the beacons 5A and 5B may have a function of determining the frequencies of the carriers of the beacon concerned on the basis of signals from other beacons received via the microphone 51 so that each beacon automatically switches the channel of the carriers transmitted from the beacon itself, thereby preventing crosstalk with other beacons.

In this regard, it is sufficiently conceivable that a beacon replacement is required particularly in the case where a clock or the like is put in the beacon or in the case where an encrypted content in the beacon information is decrypted. Therefore, it is extremely important to have a configuration for preventing crosstalk with other beacons as described above.

Conventionally, in order to perform maintenance or the like of beacons as described above, it has been necessary to connect to the network through the Internet network N or the IP network. According to the fourth embodiment, however, a user's portable terminal 6 plays a role of a communication means through the Internet network N, thereby enabling a remote operation or the like of the beacons 5A and 5B in a networkless environment (without preparing a network for beacons on the store side) advantageously.

In this regard, in the case of identifying one of a plurality of beacons and performing maintenance for the identified beacon, each beacon is enabled to recognize data for maintenance sent to the beacon itself as specifications for setting a channel for maintenance having a frequency band depending on each beacon, for including an identifier set for each beacon in data for maintenance, or the like.

Also in the ultrasonic-wave communication system 1C of the fourth embodiment, the same technical elements as described in the first embodiment are allowed to be added, thereby enabling the same operation and effect as those described above to be exerted.

Fifth Embodiment

An ultrasonic-wave communication system according to a fifth embodiment of the present invention will be described below with reference to FIGS. 15 to 17.

Although one channel is formed by two data carriers, namely the first carrier and the second carrier, in the first to fourth embodiments described above, one channel is formed by six data carriers, first to sixth carriers, in the fifth embodiment. The basic configuration of the system is the same as the configuration illustrated in the first embodiment.

Figure 15:
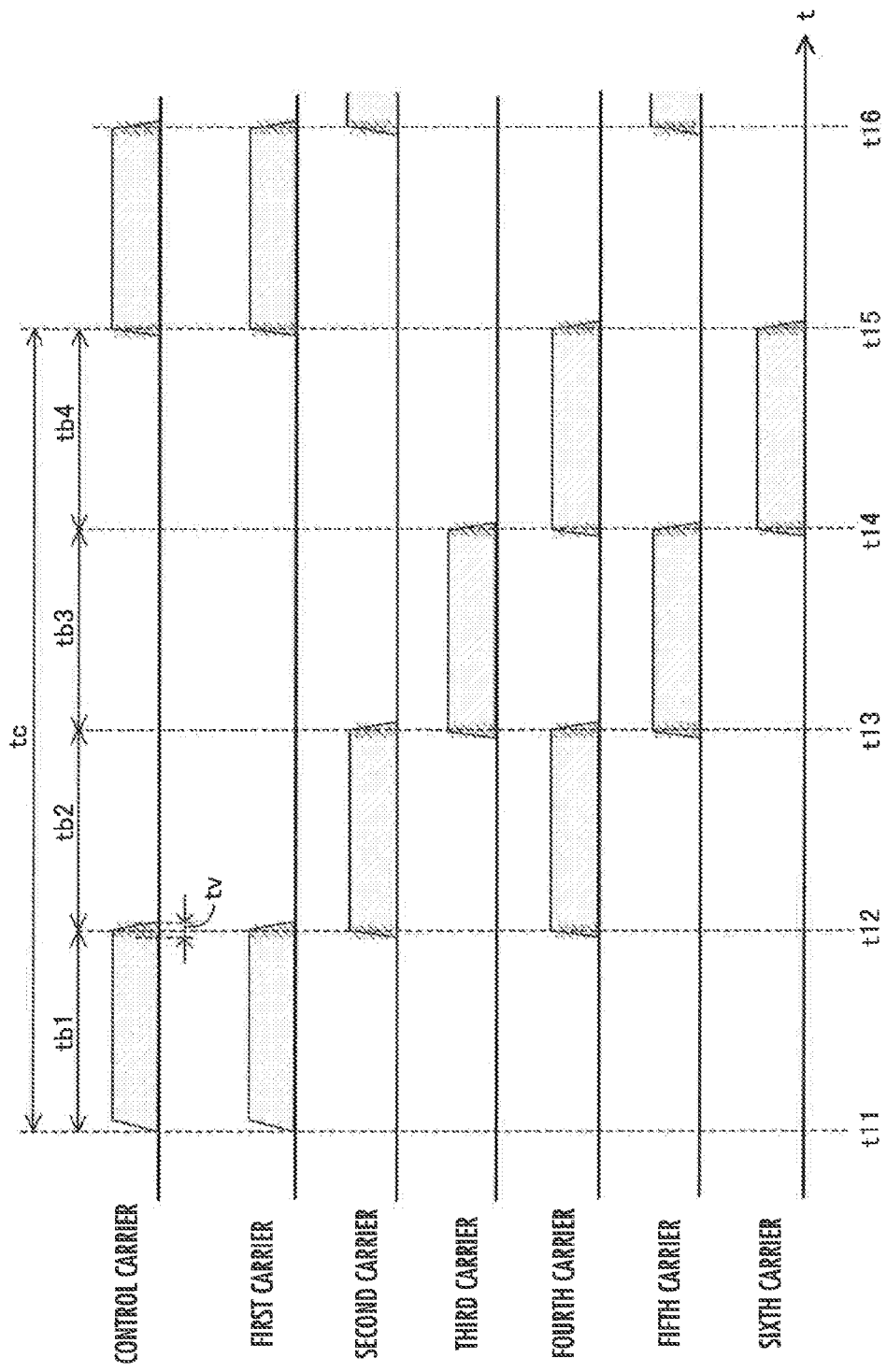
FIG. 15 is a timing chart of a control carrier and a data carrier of an ultrasonic-wave communication system according to a fifth embodiment of the present invention.

In the fifth embodiment, as illustrated in the timing chart (time axis t) in FIG. 15, the beacon 5 outputs a control carrier signal in a given cycle tc and outputs data carrier signals (first to sixth carrier signals) provided by six data carriers (the first to sixth carriers) in four divided periods tb1 (t11 to t12), tb2 (t12 to t13), tb3 (t13 to t14), and tb4 (t14 to t15) set within the period of the cycle tc.

In the fifth embodiment, the beacon 5 provides a period tv where the carrier signals before and after switching are overlapped as indicated by hatched lines in FIG. 15 when switching the output carrier signal. Thereby, similarly to the case illustrated in FIG. 7 described above, some data carrier signals are always output between the control carrier signals.

Moreover, the number of carrier signals (the control carrier signal, the first to sixth carrier signals) output in each divided period is made constant (two) except in the overlap period tv, thereby suppressing changes in sound pressure of ultrasonic waves within a predetermined range, which makes it difficult for a user of the portable terminal to hear the beacon information of ultrasonic waves.

In this regard, a dummy carrier signal is output (emitted) so as to overlap the first to sixth carrier signals by using the control carrier or other carriers in such a way that the total of the sound pressure of the ultrasonic waves is within a predetermined range (substantially constant), thereby further preventing discomfort caused by a change in the total sound pressure of ultrasonic waves to a person.

The beacon 5 repeatedly sends out the beacon information formed as described above. The number of data carriers to be used is not limited to two as in the first to fourth embodiments or to six as in the fifth embodiment, but may be two or more. Moreover, the total number of control carrier signals and data carrier signals output simultaneously may be one or more. Furthermore, the number of set output cycles tc of the control carrier signal and the number of set divided periods may be changed according to the length or the like of data constituting the beacon information.

The beacon 5 determines the output mode of the data carrier of each channel based on the beacon information according to the mapping table illustrated in FIG. 16.

In the channel illustrated in FIG. 15, the control carrier signal and the first carrier signal are output in tb1, the second carrier signal and the fourth carrier signal are output in tb2, and the third carrier signal and the fifth carrier signal are output in tb3, and the fourth carrier signal and the sixth carrier signal are output in tb4. Therefore, the illustration represents beacon information '01.13.17.20' where a data signal is assigned as follows: tb1→'01', tb2→'13', tb3→'17', and tb4→'20'.

The portable terminal 6 recognizes the beacon information by applying the outputs of the control carrier signal and the first to sixth carrier signals in the control carrier and the first to sixth carriers extracted by the FFT analysis to the mapping table illustrated in FIG. 16.

Moreover, in the case where ultrasonic waves are output by using a speaker having difficulty in producing sounds in a plurality of frequency bands at the same time like a piezoelectric device, the ultrasonic waves may be output by using a plurality of speakers as illustrated in the timing chart (time axis t) in FIG. 17.

In the example illustrated in FIG. 17, the first carrier, the second carrier, the third carrier, and the fourth carrier are output from a speaker 1 and the control carrier, the fourth carrier, the fifth carrier, and the sixth carrier are output from a speaker 2. Alternatively, one speaker may be prepared for one carrier.

According to the ultrasonic-wave communication system of the first to fifth embodiments described above, due to the use of ultrasonic waves outside the audible frequency range inaudible to human ears and the constant sound volume of ultrasonic waves over the entire range of frequencies, the ultrasonic waves are hardly heard to human ears (those of customers or employees) and therefore do not give the humans anxiety so as to remove psychological resistance or anxiety. Moreover, high-accuracy information distribution based on more accurate position information is able to be performed in a stable state and security improves in distributing beacon information, thereby increasing the possibility of introducing the beacons 5 and the like into stores or the like.

Furthermore, the present invention has advantages that a stable communication performance is ensured in the entire system, maintenance cost is low, and the system is able to be easily introduced into stores or the like so as to be further popularized, thereby enabling a system provider to easily perform sales activities.

Moreover, the use of ultrasonic waves outside the audible frequency range enables the achievement and the provision of the ultrasonic-wave communication systems 1 to 1C having excellent performances such as being resistant to ambient noises generated by a rat repellent, a cockroach repellent, mosquito sound for preventing young people from hanging out, an ultrasonic cleaning machine for glasses or the like, digital signage, electrical appliances, and the like and ensuring stable communication.

In addition to the case of application in the communication between a store and customers' portable terminals in the store or the like as described above, the present invention is widely applicable to uses such as, for example, the presence confirmation of individual attendees in a conference hall or the like where a large number of attendees holding portable terminals gather together or the presence confirmation of a large number of customers holding portable terminals in an event site or the like.

DESCRIPTION OF REFERENCE NUMERALS

1 Beacon, ultrasonic-wave communication system using portable terminal
1A Beacon, ultrasonic-wave communication system using portable terminal,
1B Beacon, ultrasonic-wave communication system using portable terminal
1C Beacon, ultrasonic-wave communication system using portable terminal
2 Computer device
3 Salesroom
4 Ceiling
5 Beacon
5A Beacon
5B Beacon
6 Portable terminal
7 Server
10 Control unit
11 Memory
12 Storage unit
13 Communication processing unit
14 Operating unit
15 Display unit
16 Printer
17 Beacon controller
18 Store information output unit
20 Frequency switching unit
21 Store information receiving unit
22 Encryption processing unit
23 Control carrier transmitting unit
24 Carrier signal synchronization control unit
25 First carrier signal output unit
25a First carrier signal output unit 26 Second carrier signal output unit
26a Second carrier signal output unit
27 Amplitude modulation unit
28 D/A converter
29 Beacon information transmitting unit
30 Clock
31 Control unit
32 Memory
33 Wireless transceiver
34 Display unit
35 Operating unit
36 Microphone
37 Demodulation processing unit
38 Decryption processing unit
39 Storage unit
40 Speaker
41 D/A converter
51 Microphone
52 Speaker
N Internet network

The invention claimed is:

1. An ultrasonic-wave communication system performing communication using ultrasonic waves, the ultrasonic-wave communication system comprising:
a beacon configured to emit ultrasonic waves;
a portable terminal configured to receive the ultrasonic waves; and
a server configured to communicate with the portable terminal, wherein:
the beacon is further configured to:
emit three or more signal carriers predetermined as frequencies different from each other;
output a data signal formed by the three or more signal carriers according to predetermined information; and
emit a dummy signal to supplement changes in sound pressure during outputting the data signal so that the sound pressure output from the beacon is within a predetermined range;
the portable terminal comprises:
a microphone;
a demodulation processing unit configured to perform demodulation processing to demodulate the three or more signal carriers by analyzing frequencies or wavelengths of the ultrasonic waves transmitted from the beacon upon the reception of the ultrasonic waves; and
a decryption processing unit configured to perform decryption processing to decrypt the predetermined information based on the data signal recognized by the demodulation processing;
the beacon comprises:
a first clock unit;
a first storage unit configured to hold data of a first encryption key random number table by which an encryption key according to clock time of the first clock unit is determined by a predetermined logic;
an encryption processing unit configured to encrypt the predetermined information by a first encryption key determined according to the first encryption key random number table; and
an encryption key access prohibiting unit configured to prohibit access to the first encryption key random number table from units other than the encryption processing unit;
the beacon is further configured to generate the data signal by using the encrypted predetermined information;
the server comprises:
a second clock unit configured to have clock time to be same as the clock time of the first clock unit; and
a second storage unit configured to hold data of a second encryption key random number table having a same configuration as the first encryption random number table; and
the server is configured to recognize the predetermined information by decrypting an encrypted data, when receiving the encrypted data encrypted by the first encryption key from the portable terminal, by using a second encryption key obtained by applying the clock time of the second clock unit at receiving the encrypted data to the second encryption key random number table.

2. The ultrasonic-wave communication system according to claim 1, wherein the beacon is further configured to output the data signal formed by the signal carriers a predetermined number of times between predetermined control signals that is formed by one or more of the three or more signal carriers.

3. The ultrasonic-wave communication system according to claim 1, wherein, in a case where n is a number of signal carriers set in the beacon, the number of signal carriers simultaneously output from the beacon is one or more and less than n.

4. The ultrasonic-wave communication system according to claim 1, wherein:
the ultrasonic-wave communication system comprises a plurality of the beacons;
a combination of the three or more signal carriers is individually assigned to each beacon with frequency settings being different from each other;
each beacon is configured to generate beacon information of one channel based on the assigned combination, and send out the beacon information as an ultrasonic wave; and
the demodulation processing unit of the portable terminal is further configured to receive the beacon information suitable for frequency characteristics of the microphone among the beacon information of the ultrasonic wave sent from the respective beacons, and perform demodulation processing for the received beacon information.

5. The ultrasonic-wave communication system according to claim 1, wherein:
the beacon is further configured to generate the beacon information of one channel made by combining the three or more signal carriers by a plurality of channels with the frequencies thereof different from each other, and send out the beacon information of the plurality of channels by ultrasonic waves; and
the demodulation processing unit of the portable terminal is further configured to receive the beacon information of a channel suitable for the frequency characteristics of the microphone of the portable terminal among the beacon information of the ultrasonic waves of the plurality of channels sent from the beacon, and perform the demodulation processing for the received beacon information.

6. The ultrasonic-wave communication system according to claim 1, wherein:
the portable terminal comprises a unit configured to acquire Internet information from a server through the Internet, and a unit configured to output the acquired Internet information as ultrasonic waves from a speaker; and the beacon comprises a microphone and a unit configured to acquire the Internet information provided from the server via the portable terminal by receiving the Internet information of the ultrasonic waves output from the speaker of the portable terminal via the microphone.

7. The ultrasonic-wave communication system according to claim 6, wherein:
the plurality of beacons are arranged in specific zones;
the beacon that acquired the Internet information from the server via the portable terminal is configured to output the Internet information by ultrasonic waves from the speaker; and
other beacons are configured to receive the Internet information by the ultrasonic waves through the microphones, by which the Internet information is transmitted between the plurality of beacons.

8. The ultrasonic-wave communication system according to claim 1, further comprising a third storage unit configured to store a predetermined number of data of the predetermined information with contents of the data different from each other,
wherein the beacon is further configured to acquire the data of the predetermined information with the contents different from each other from the third storage unit, and update the predetermined information used to generate the data signal when the number of times the data signal is sent out exceeds a predetermined number of times or when a period in which the data signal is sent out exceeds a predetermined period.

9. The ultrasonic-wave communication system according to claim 1, wherein the beacon is further configured to generate the three or more signal carriers by performing amplitude modulation using signals indicating the predetermined information with respect to three or more carrier signals having frequencies outside an audible range.

10. The ultrasonic-wave communication system according to claim 1, wherein a number of carrier signals simultaneously output from the three or more signal carriers is constant in the data signal.

11. The ultrasonic-wave communication system according to claim 1, wherein:
the beacon is further configured to generate the data signal by using encrypted predetermined information; and
the portable terminal is further configured to recognize the predetermined information by decrypting the encrypted predetermined information demodulated from the data signal received from the beacon.

12. A beacon used in an ultrasonic-wave communication system performing communication using ultrasonic waves between the beacon emitting ultrasonic waves and a portable terminal, wherein:
the beacon is configured to:
emit three or more signal carriers predetermined as frequencies different from each other;
output a data signal formed by the three or more signal carriers according to predetermined information; and
emit a dummy signal to supplement changes in sound pressure during outputting the data signal so that the sound pressure output from the beacon is within a predetermined range;
the beacon comprises:
a first clock unit;
a first storage unit configured to hold data of a first encryption key random number table by which an encryption key according to clock time of the first clock unit is determined by a predetermined logic;
an encryption processing unit configured to encrypt the predetermined information by a first encryption key determined according to the first encryption key random number table; and
an encryption key access prohibiting unit configured to prohibit access to the first encryption key random number table from units other than the encryption processing unit;
the beacon is further configured to generate the data signal by using the encrypted predetermined information; and
a server comprises:
a second clock unit configured to have clock time to be same as the clock time of the first clock unit; and
a second storage unit configured to hold data of a second encryption key random number table having a same configuration as the first encryption key random number table; and
the server is configured to recognize the predetermined information by decrypting an encrypted data, when receiving the encrypted data encrypted by the first encryption key from the portable terminal, by using a second encryption key obtained by applying the clock time of the second clock unit at receiving the encrypted data to the second encryption key random number table.

13. A non-transitory computer readable memory storing a portable terminal program used in an ultrasonic-wave communication system performing communication using ultrasonic waves between a beacon emitting ultrasonic waves and a portable terminal, the program being executed in a CPU installed in the portable terminal to cause the CPU to:
perform demodulation processing to demodulate three or more signal carriers by analyzing frequencies or wavelengths of a data signal upon receiving the data signal transmitting from the beacon, the data signal being formed by three or more signal carriers predetermined as frequencies different from each other according to predetermined information and comprising a dummy signal emitted to supplement changes in sound pressure so that the sound pressure is within a predetermined range; and
decrypt the predetermined information based on the data signal recognized by the demodulation processing, wherein:
the beacon comprises:
a first clock unit;
a first storage unit configured to hold data of a first encryption key random number table by which an encryption key according to clock time of the first clock unit is determined by a predetermined logic;
an encryption processing unit configured to encrypt the predetermined information by a first encryption key determined according to the first encryption key random number table; and
an encryption key access prohibiting unit configured to prohibit access to the first encryption key random number table from units other than the encryption processing unit;
the beacon is further configured to generate the data signal by using the encrypted predetermined information;
the server comprises:
a second clock unit configured to have clock time to be same as the clock time of the first clock unit; and
a second storage unit configured to hold data of a second encryption key random number table having a same configuration as the first encryption key random number table; and the server is configured to recognize the predetermined information by decrypting an encrypted data, when receiving the encrypted data encrypted by the first encryption key from the portable terminal, by using a second encryption key obtained by applying the clock time of the second clock unit at receiving the encrypted data to the second encryption key random number table.

14. A program-providing server communicating with a portable terminal used in an ultrasonic-wave communication system performing communication using ultrasonic waves, via a network, between a beacon emitting ultrasonic waves and a portable terminal, wherein:

the server is configured to send a portable terminal program to the portable terminal, the program being executed in a CPU installed in the portable terminal to cause the CPU to:

perform demodulation processing to demodulate three or more signal carriers by analyzing frequencies or wavelengths of a data signal upon receiving the data signal transmitted from the beacon, the data signal being formed by three or more signal carriers predetermined as frequencies different from each other according to predetermined information and comprising a dummy signal emitted to supplement changes in sound pressure so that the sound pressure is within a predetermined range; and decrypt the predetermined information based on the data signal recognized by the demodulation processing;

the beacon comprises:
a first clock unit;
a first storage unit configured to hold data of a first encryption key random number table by which an encryption key according to clock time of the first clock unit is determined by a predetermined logic;
an encryption processing unit configured to encrypt the predetermined information by a first encryption key determined according to the first encryption key random number table; and
an encryption key access prohibiting unit configured to prohibit access to the first encryption key random number table from units other than the encryption processing unit;

the beacon is further configured to generate the data signal by using the encrypted predetermined information;

the server comprises:
a second clock unit configured to have clock time to be same as the clock time of a first clock unit of the beacon; and
a second storage unit configured to hold data of a second encryption key random number table having a same configuration as the first encryption key random number table; and the server is configured to recognize the predetermined information by decrypting an encrypted data, when receiving the encrypted data encrypted by a first encryption key from the portable terminal, by using a second encryption key obtained by applying the clock time of the second clock unit at receiving the encrypted data to the second encryption key random number table.

\* \* \* \* \*